United States Patent [19]

Kobayashi et al.

[11] Patent Number: 5,817,940
[45] Date of Patent: Oct. 6, 1998

[54] ANGULAR RATE DETECTOR

[75] Inventors: Toshihiro Kobayashi, Nagoya; Ken Okumura, Hekinan; Katsuyoshi Mizumoto, Kuwana; Isao Hagiwara, Anjo, all of Japan

[73] Assignee: Aisin Seiki Kabishiki Kaisha, Kariya, Japan

[21] Appl. No.: 820,391

[22] Filed: Mar. 12, 1997

[30] Foreign Application Priority Data

Mar. 14, 1996  [JP]  Japan ................... 8-057328
Mar. 14, 1996  [JP]  Japan ................... 8-058077
Mar. 15, 1996  [JP]  Japan ................... 8-059237

[51] Int. Cl.[6] ............................................. G01P 3/44
[52] U.S. Cl. .............................. 73/504.12; 73/504.13
[58] Field of Search ..................... 73/504.12, 504.13, 73/504.02

[56] References Cited

U.S. PATENT DOCUMENTS

| | | | |
|---|---|---|---|
| 5,419,194 | 5/1995 | Varnham et al. | 73/504.13 |
| 5,471,875 | 12/1995 | Sato et al. | 73/504.13 |
| 5,540,094 | 7/1996 | Varnham et al. | 73/504.13 |
| 5,561,400 | 10/1996 | Iguchi et al. | |

FOREIGN PATENT DOCUMENTS

| | | |
|---|---|---|
| 5240649 | 9/1993 | Japan . |
| 5288555 | 11/1993 | Japan . |
| 7332986 | 12/1995 | Japan . |
| 8105747 | 4/1996 | Japan . |
| 2266149 | 10/1993 | United Kingdom . |

*Primary Examiner*—Hezron E. Williams
*Assistant Examiner*—Richard A. Moller
*Attorney, Agent, or Firm*—Sughrue, Mion, Zinn, Macpeak & Seas, PLLC

[57] ABSTRACT

An angular rate detector is disclosed having a first and a second detecting electrode 6a, 7a, which detect a second oscillation produced by Coriolis force, and disposed at locations which are symmetrical with respect to a direction of excitation D2 of a piezoelectric oscillator 2 and which corresponds to nodes of a first oscillation produced by the excitation. When the piezoelectric oscillator 2 rotates in a certain direction, a first signal appearing at the first detecting electrode 6a will be lagging in phase while a second signal appearing at the second detecting electrode 7a will be leading in phase. An electrical circuit produces an angular rate signal which represents a phase difference between the first and the second signal. In order to achieve a level of the first and the second signal which can be sensed by the electrical circuit it the angular rate is equal to zero, in a first embodiment, the first and the second detecting electrode 6a, 7a are disposed so as to be offset from nodes of the first oscillation of the oscillator 2 by an amount $\Theta$ toward the direction of the first oscillation D2. In a second embodiment, impedances of electrical circuits of the vibration system D2 and the detection system D3, D4 are chosen so that the resonant frequencies of the first and the second oscillation are different relative to each other. In a third embodiment, a weight is added to or a notch is formed in the oscillator to achieve a relative offset between the resonant frequencies of the first and the second oscillation.

14 Claims, 22 Drawing Sheets

ANGULAR RATE DETECTOR

CROSS-REFERENCE TO RELATED PATENT APPLICATION

U.S. patent application Ser. No. 08/461,743 filed on Jun. 5, 1995 and entitled "Angular Rate Detector", the inventors being Yutaka Iguchi et al. The detector includes an oscillator having a first terminal to which a drive voltage is applied, a second terminal where a signal occurs having a given phase displacement with respect to a signal appearing at the first terminal during a resonance of the oscillator and a third terminal where a signal occurs having a phase which changes in accordance with an angular rate. An oscillator is provided for producing an alternative signal which corresponds to the drive voltage applied to the first terminal and varying in accordance with the signal appearing at the second terminal. A frequency multiplier responsive to a signal which corresponds to the oscillation frequency of the oscillator produces a clock pulse having a frequency higher than the oscillation frequency. A phase difference pulse signal is produced having a duty cycle which changes in accordance with a phase difference between the signal occurring at the third terminal of the oscillator and either the signal applied to the first terminal or the signal occurring at the second terminal. A counter is provided for counting the clock pulses during a time interval when the phase difference pulse signal assumes either a high or low level.

FIELD OF THE INVENTION

The invention relates to an angular rate detector which detects an oscillation of an oscillator caused when a Coriolis force which is produced when the oscillator undergoes an angular rate, and in particular, to an angular rate detector provided with a first and a second oscillation sensor which are positioned symmetrically with respect to the direction of a first oscillation which occurs as it is excited by an oscillation excitation circuit, each detecting a second oscillation caused by the Coriolis force.

BACKGROUND OF THE INVENTION

An arrangement which detects an angular rate of rotation using an oscillator is disclosed in Japanese Laid-Open Patent Applications No. 240,649/93 and No. 288,255/93 and British Patent Application GB 2,266,149A, for example.

In these disclosures, an oscillator such as a piezoelectric element is driven for resonance at the frequency which is coincident with natural frequency of the oscillator. A detecting electrode is disposed on the oscillator at the nodal point of the natural oscillation, and angular rate signal is obtained from a voltage developed at the detecting electrode from which a component representing a natural oscillation is removed. Since the detecting electrode is positioned at the nodal point of the natural oscillation, it theoretically follows that no voltage appears at the detecting electrode when no angular rate is applied to the oscillator. However, when the oscillator experiences an angular rate in a direction from an antinode where an exciting electrode is disposed toward a nodal point where the detecting electrode is disposed or in a reverse direction, Coriolis force is applied to the oscillator, whereby the direction of the oscillation will be twisted to the direction of the Coriolis force or the direction of the angular rate. The nodal point of the twisted oscillation will then be the displaced from the detecting electrode, thereby giving rise to a voltage. In this manner, an oscillating voltage is developed at the detecting electrode which corresponds to the Coriolis force or the angular rate. The level of the oscillating voltage and a phase displacement thereof with respect to the exciting voltage correspond to the Coriolis force or the angular rate. However, in actuality, the detecting electrode has a finite extension and the center of the detecting electrode is not in complete alignment with the nodal point of natural oscillation caused by the excitation when viewed microscopically, and accordingly, there is developed at the detecting electrode not only a voltage which corresponds to the Coriolis force, but also a voltage which results from the excited natural oscillation. For this reason, the component representing the natural oscillation is removed from the voltage developed at the detecting electrode.

However, the natural frequency of an oscillator varies under the influence of ambient temperatures or the like. Accordingly, when driving the oscillator at a given frequency in an environment which undergoes a temperature change, it is impossible to maintain the operation of the oscillator at its resonance. A deviation of the operation of the oscillator from the resonance causes a fluctuation in the amplitude of the oscillation, causing an error in the relationship between the phase difference and the angular rate.

To accommodate for this, in the cited British Patent Publication No. 2,266,149A, PLL (phase locked loop) circuit is employed in an attempt to maintain the operation of the oscillator at its resonance. Specifically, the frequency of the oscillation of the VCO (voltage controlled oscillator) is automatically adjusted so that a signal applied to a drive terminal of the oscillator has a phase difference of 90° with respect to a signal occurring at a terminal of the oscillator from which a feedback voltage is derived.

In Japanese Laid-Open Patent Application No. 332,986/95, the excitation of the oscillator is converged to the natural frequency by shifting the frequency of a clock pulse, or address counting pulse, applied to a sinusoidal wave function generator using an ROM in a PLL circuit.

In Japanese Laid-Open Patent Application No. 105,747/96 and its counterpart U.S. Pat. No. 5,561,400, a bandpass filter having a resonant frequency and a phase shift which vary in accordance with a bias voltage is inserted into a feedback excitation loop for the oscillator, and the bias voltage is varied in a manner to correspond to the phase difference between an exciting voltage and a feedback voltage to cause a convergence of the excitation of the oscillator to the natural frequency. By automatically tuning the excitation of the oscillator with the natural frequency, a fluctuation in the level of the detecting voltage and a phase displacement with respect to the angular rate is reduced, thus stabilizing the accuracy of detection.

Since the detecting electrode is disposed at the nodal point of the excited oscillation, it follows that when an angular rate is low, the level of the detecting voltage is low. If the level is below that which can be compensated for by a signal processing circuit, the angular rate cannot be quantitatively determined. In other words, when the detecting voltage is below a level which can be compensated for by the signal processing circuit, the angular rate is regarded as "0", thus delivering a signal which represents a zero angular rate. Thus the resolution is degraded for lower angular rates. The same is true for a technique in which a signal representing a phase displacement is produced and is then converted into an angular rate signal, inasmuch as the detection of the phase displacement takes place on the basis of the level of the detecting voltage.

SUMMARY OF THE INVENTION

The invention has for its first object an improvement of the accuracy with which low angular rate is detected, and for its second object a stabilization of the detection of an angular rate according to the detection of the phase displacement.

The present inventors have investigated into the cause of difficulty in detecting an angular rate on the basis of phase displacement which is experienced when the piezoelectric oscillator exhibits a high level of symmetry. This will be described below with reference to an example of sensor element 10, the overall view of which is shown in FIG. 3 and the cross section of which is shown in the FIG. 10a.

Referring to FIG. 3, the sensor element 10 includes a cylindrical piezoelectric body 2 or a piezoelectric oscillator having a lower end which is integrally formed with an element base including a disc at its top end and a limb in the form of a round rod continuing from the bottom surface of the disc. A substantially upper half of the outer peripheral surface of the cylindrical piezoelectric body 2 is covered by a reference potential electrode 3a which is connected to a circuit reference potential, while eight electrode segments of an identical configuration are cemented to the lower half of the outer peripheral surface substantially at a pitch of 45°. The inner peripheral surface of the cylindrical piezoelectric body 2 is covered by a reference potential electrode 3b which assumes the same potential as the electrode 3a.

Referring to the circuit diagram shown in FIG. 10a, eight electrode segments are shown. As shown, a pair of electrode segments 4a and 4b which are disposed opposite to each other along a first diametrical direction D1 represent feedback electrodes, another pair of electrode segments 5a and 5b which are disposed opposite to each other along a second diametrical direction D2 which is orthogonal to the direction D1 represent exciting electrodes, and a further pair of electrode segments 6a and 6b which are disposed opposite to each other adjacent to a third diametrical direction D3 which represents a bisector between directions D1 and D2 or which is located at an angle of 45° from the direction D1 represent a first set of detecting electrodes. Still another pair of electrode segments 7a and 7b which are disposed opposite to each other adjacent to a fourth diametrical direction D4, which is orthogonal to the direction D3, represent a second set of detecting electrodes.

An alternating voltage produced by an oscillator circuit is applied across the exciting electrodes 5a, 5b and the reference potential electrode 3a, 3b, whereby the cylindrical piezoelectric body 2 undergoes a deformation and an oscillation. In response to the oscillation of the piezoelectric body 2, a signal appears at the feedback electrodes 4a and 4b, and is fed back to the oscillator circuit. By utilizing such a feedback signal, the frequency of the output signal from the oscillator circuit is automatically adjusted so that the cylindrical piezoelectric body 2 oscillates at the frequency which is coincident with a resonant frequency fm thereof.

When the power supply to the oscillator circuit is turned on, a certain voltage is applied across the exciting electrodes 5a, 5b and the reference potential electrodes 3, whereby the cylindrical piezoelectric body 2 expands or shrinks in the second diametrical direction D2. Such deformation causes a voltage to be developed between the feedback electrodes 4a and 4b and reference potential electrodes 3a, 3b. As it appears during the oscillation of the cylindrical piezoelectric body 2 in the second diametrical direction D2 at the resonant frequency fm, the piezoelectric body 2 at the peak of shrinkage is shown exaggerated by dotted lines 2B, and the piezoelectric body 2 at the peak of the expansion is shown exaggerated by phantom lines 2A in FIG. 13.

It will be noted from FIG. 13 that the expansion/shrinkage in the second diametrical direction D2 corresponds to the shrinkage/expansion in the first diametrical direction D1, and the peak of shrinkage in the direction D2 corresponds to the peak of expansion in the direction D1. Accordingly in this example, the cylindrical piezoelectric body 2 oscillates in cruciform directions D1 and D2.

When the cylindrical piezoelectric body 2 is oscillating in the cruciform directions D1 and D2 as mentioned above (see phantom lines 2A and dotted lines 2B in FIG. 13), the detecting electrodes 6a, 6b, 7a, 7b are located adjacent to the node of oscillation, and accordingly, any voltage developed across these detecting electrodes and the reference potential electrodes 3a, 3b is substantially small.

When the cylindrical piezoelectric body 2 rotates, for example, when it rotates in the clockwise direction ω as shown in FIG. 13, Coriolis forces F1 to F4 are produced as a result of such rotation and oscillation of the piezoelectric body 2, whereby the direction of the oscillation (D2) of the piezoelectric body 2 will be twisted or rotated to the fourth diametrical direction D4, as indicated by the phantom lines 2D in FIG. 4 for example, causing a change in the voltage developed at the detecting electrodes 6a, 6b.

For the convenience of description, the electrodes 5a, 5b which urge the oscillation in the direction D2 as well as an electrical circuit connected thereto will be referred to as a vibrator system while the electrodes 6a, 6b which detect an oscillation in the direction D3 as well as an electrical circuit connected thereto will be referred to as a first detection system. It will be noted that the direction D4 is symmetrical to the direction D3 with respect to the direction D2, and the electrodes 7a, 7b which detect an oscillation in the direction D4 as well as an electrical circuit connected thereto will be referred to as a second detection system.

Considering the oscillation of the vibrator system as a mode I (first oscillation), represented by Asin (φ1t+a) and the oscillation of the first and second detection system as a mode II, represented by Bsin (φ2t+b), an oscillation when an angular rate ω is acting may be represented as Csin (φ3t+c), which can be considered as a resultant of the oscillations in the mode I and II. Thus:

$$A \sin (\phi 1t+a)+B \sin (\phi 2t+b)=C \sin (\phi 3t+c) \quad (1)$$

when $\phi 1=\phi 2=\phi 3$, $$C=\sqrt{[A^2+B^2+2AB \cos (b-a)]} \quad (2)$$

$$c=\arctan [(A \sin a+B \sin b)/(A \cos a+B \cos b)] \quad (3)$$

It will be noted that when the frequency of the oscillation of the vibrator system is equal to the frequency of the oscillation in the first and the second detection system, (i.e., φ1=φ2=φ3) there occurs no change in the phase (or a change in c) which corresponds to the angular rate φ while when a≠b, or when the frequencies of oscillation are different, there occurs a change in the phase (a change in c) which corresponds to the angular rate ω. It is to be noted that a phase change in the oscillation of the first detection system occurs in opposite direction from a phase change in the oscillation of the second detection system. A relationship between a difference in the resonant frequency between the vibration system and the detection system and a phase displacement which corresponds to an angular rate ω is graphically shown in FIG. 17.

A curve shown in solid line in FIG. 17 corresponds to an angular rate ω of 90°/sec while a curve shown in dotted lines corresponds to an angular rate ω of 20°/sec. When there is little difference in the resonant frequencies, a phase displacement cannot be detected, but a phase displacement can be detected for a difference in the resonant frequencies which is equal to or greater than about 10 Hz. As long as the phase displacement can be detected, a phase displacement which occurs in response to a change in an angular rate ω is greater, the less the difference in the resonant frequencies. For example, when a difference in the resonant frequencies is Δf≈16 Hz, as the angular rate ω changes from 90°/sec to 20°/sec or changes in the opposite direction, a change in the phase displacement will be substantially equal to 15°, thus providing a high resolution in detecting the angular rate and improving the accuracy of detecting the angular rate when it remains in a range of low values.

An angular rate detector according to the invention comprises an oscillator (2); exciting means (5a, 64/26) for causing the oscillator (2) to oscillate; first and second oscillation detecting means (6a, 13 and 7a, 14) disposed symmetrically with respect to the direction of a first oscillation (D2) of the oscillator as it is excited for detecting a second oscillation (in direction D3 and D4) which occurs as a result of Coriolis force produced by an angular rate (ω) applied to the oscillator; and means (51–54/41–32) for detecting a phase difference (ΔT) between the oscillations (D3,D4) as detected by the first and the second oscillation detection means (6a, 13 and 7a, 14). It is to be understood that reference numerals and characters as used to denote corresponding elements or events appearing in an embodiment to be described later are indicated in the parentheses in order to facilitate the understanding.

When a rotation about an axis perpendicular to a plane which includes the direction (D2) of the first oscillation is applied to the oscillator (2), the resulting angular rate (ω) produces Coriolis force which causes the second oscillation (in directions D3 and D4) to be produced. As the angular rate increases, the signal from the first oscillation detecting means (6a, 13) will be lagging in phase while the signal from the second oscillation detecting means (7a, 14) is leading in phase. Thus, a change in the phase with respect to an increase/reduction in the angular rate (ω) occurs in the opposite directions from each other between the first oscillation detecting means (6a, 13) and the second oscillation detecting means (7a, 14). Accordingly, a phase difference therebetween will be a difference between changes occurring in the phases which occur in response to the angular rate, or will assume a value which is equal to double a phase change occurring in the either detecting means in response to the angular rate. In this manner, the sensitivity of the phase difference (ΔT) as detected by the phase difference detecting means(51–54/41–32) relative to the angular rate will be enhanced.

In a first embodiment of the invention to be described later (in connection with FIGS. 1a and 1b), the first and the second oscillation detecting means (6a, 13 and 7a, 14) detect the second oscillation at a location which is by a given amount (θ) offset toward the first oscillation (D2) with respect to the direction (D3,D4) of the second oscillation which results from Coriolis force produced when the angular rate (ω) is acting. As a consequence, a detection signal from the first and the second oscillation detecting means includes a first oscillation component (D2) which is contained at a higher proportion than in the prior art, and which serves as a bias component to raise the level of the detection signal. As a consequence, if the angular rate is equal to zero, the level of the detection signal is not zero, but assumes a level which is picked out by a signal processing circuit. In this manner, the accuracy of detecting the angular rate in the region around zero is enhanced.

In a second embodiment of the invention to be described later (FIGS. 10a and 10b), the exciting means (5a, 26) has an impedance which is different from an impedance of the first and the second oscillation detecting means (6a, 13 and 7a, 14) so that the resonant frequency of the exciting means (5a, 26) and the resonant frequency of the oscillation detecting means, as viewed from the oscillator (2), differ from each other by a given amount (Δf) or greater. Specifically, the oscillation of the vibrator system is accurately brought to the natural frequency by a feedback control while the impedance of the oscillation detecting means (6a, 13 and 7a, 14) is chosen so that the resonant frequency of the oscillation detection system is by a given amount (Δf) offset from the natural frequency.

By changing the rigidity or the mass of the oscillator (2) or the both between the first oscillation (D2) of the vibrator system and the second oscillation (D3, D4) of the detection system, a difference will be produced between the resonant frequencies of the mode I (vibrator system) and mode II (detection system). However, a change in the resonant frequency can be produced by adjusting the impedance of the electrical circuit in the manner mentioned above, and this is equivalent to that produced by a change in the mechanical rigidity of the oscillator (2) itself. However, no machining is applied to the oscillator (2) itself, and such change can be realized by merely adjusting the parameters of the circuit elements, which is easily implemented. In this manner, it is a simple matter to adjust the difference between the resonant frequency of the vibrator system and the resonant frequency of the oscillation detecting system.

In the second embodiment, first oscillation detecting means (6a, 13) comprises a first electrode (6a) for detecting a second oscillation (D3), and a first amplifier (13) connected to the first electrode (6a). Second oscillation detecting mean (7a, 14) comprises a second electrode (7a) for detecting a second oscillation (D4), and a second amplifier (14) connected to the second electrode (7a). As viewed from the oscillator (2), a termination resistance (Re) of the first and the second amplifier (13, 14) is substantially equal to each other. As the angular rate (ω) is applied, the phase of an output signal from the first and the second amplifier (13, 14) relative to exciting voltage shifts differently, thus one lagging while the other leading, whereby a phase difference between both output signals will assume a value which is tantamount to the doubled magnitude of a single output from either amplifier. In this manner, the accuracy of detecting the angular rate (ω), in particular, in a region of low values thereof, will be improved.

In a third embodiment of the invention to be described later (FIGS. 18 and 19), the oscillator (2) has a resonant frequency in the direction (D2) of the first oscillation, and another resonant frequency in the direction (D3,D4) of the second oscillation which is different from the first mentioned resonant frequency. Since the resonant frequency of the vibrator system and the resonant frequency of the oscillation detection system are different, a phase displacement which responds to the angular rate (ω), as shown in FIG. 17, appears in a detection signal from the oscillation detecting means (6a, 13 and 7a, 14), thus enabling a detection of the angular rate on the basis of the phase displacement, which contributes to enhancing the accuracy of detecting the angular rate in a region of low values thereof.

Denoting the mass of the oscillator by m and a spring constant by k, the resonant frequency f of the oscillator (2) is represented as follows:

$$f = (1/2\pi)\sqrt{(k/m)} \qquad (4)$$

It will be seen that the resonant frequsncy f can be changed by changing the mass. In the third embodiment, the oscillator (2) has a symmetrical configuration about its central axis, and exciting means (5a, 26) includes an exciting electrode (5a). Mass changing means (Qa, Qb/Ra, Rb) which determines the resonant frequency in the direction (D2) of the first oscillation is disposed at a point where the oscillator is intersected by a plane which contains the center of the exciting electrode (5a) and the central axis.

Alternatively mass changing means (Qa, Qb/Ra, Rb) which determines the resonant frequency of the second oscillation (D3, D4) may be disposed at a point where the ocillator is intersected by a plane which contains the direction of the second oscillation (D3, D4) and the central axis. Specifically, mass changing means either comprises a weight (Qa, Qb) added to the oscillator (2) or a notch (Ra, Rb) formed in the oscillator (2).

With the described arrangement, the oscillator (2) exhibits a mass with respect to the first oscilation (D2) produced by the exciting electrodes (5a) and another mass with respect to the second oscillation (D3,D4) which is different from the first mentioned mass, whereby the vibrator system and the detector system exhibit different resonant frequencies to allow a phase displacement which responds to an angular rate (ω) to appear in a detection signal from the oscillation detection means to enable a detection of an angular rate on the basis of a phase displacement. This enhances the accuracy of detection of the angular rate in a region of low values thereof.

When the oscillator 2 is cylindrical in configuration and is provided with an exciting electrode 5a and a detecting electrode 6a around its peripheral surface, as shown in FIGS. 18 and 19, the oscillator 2 oscillates in cruciform directions, namely, it oscillates not only in a diametrical direction D2, but also in the direction D1 which is orthogonal thereto. Accordingly, mass changing means (Qa–Qd/Ra–Rd) may be disposed at four points on the cruciform directions to enable a balanced oscillation. Similarly, where mass changing means is provided in order to determine the resonant frequency in the direction of the second oscillation, mass changing means is provided at four points.

Above and the other objects and features of the invention will become apparent from the following description of several embodiments thereof with reference to attached drawings.

BRIEF DESCRIPTIONS OF THE DRAWINGS

Figure 1A:
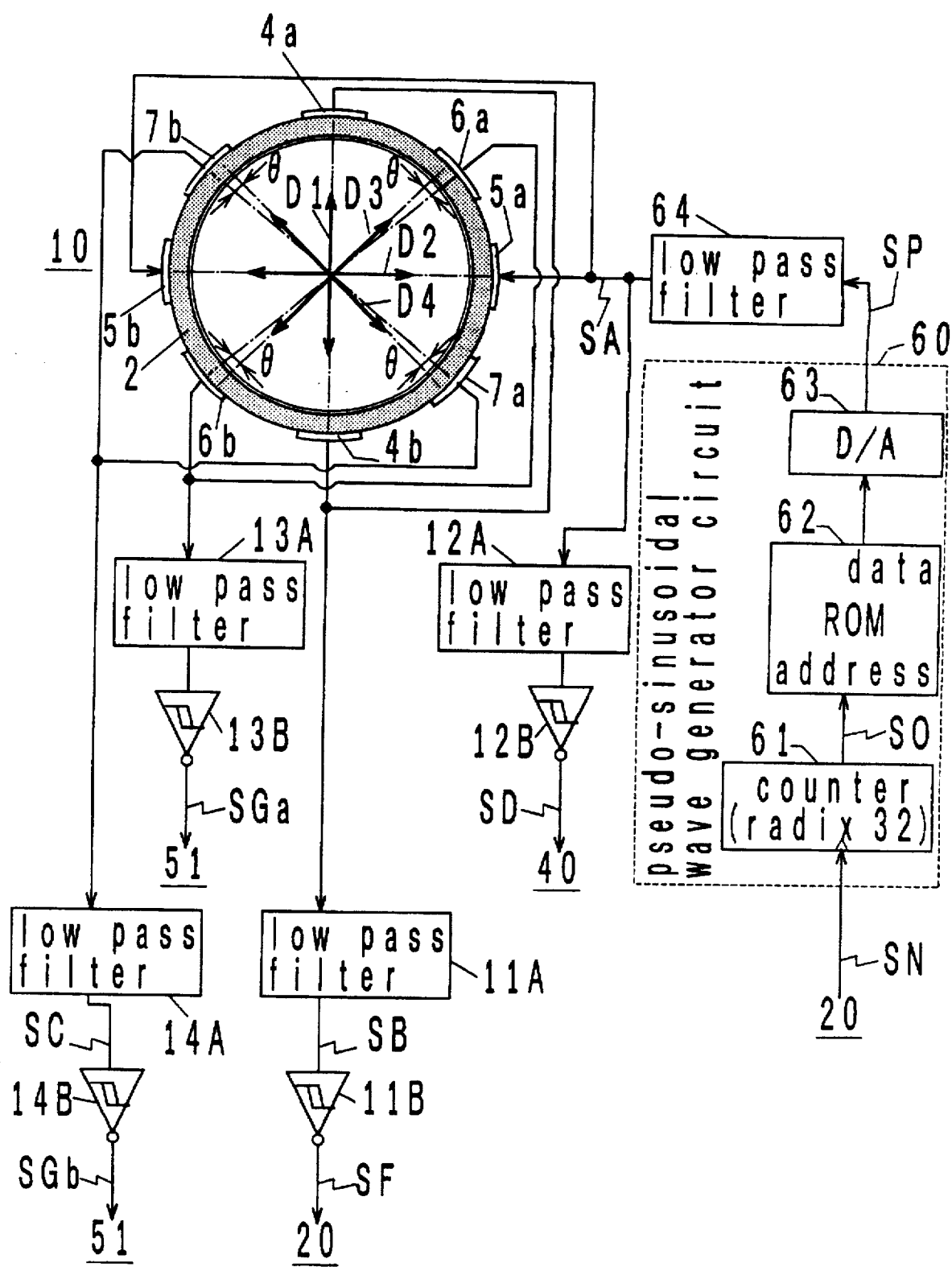
FIG. 1a is a block diagram of part of a first embodiment of the invention.
Figure 1B:
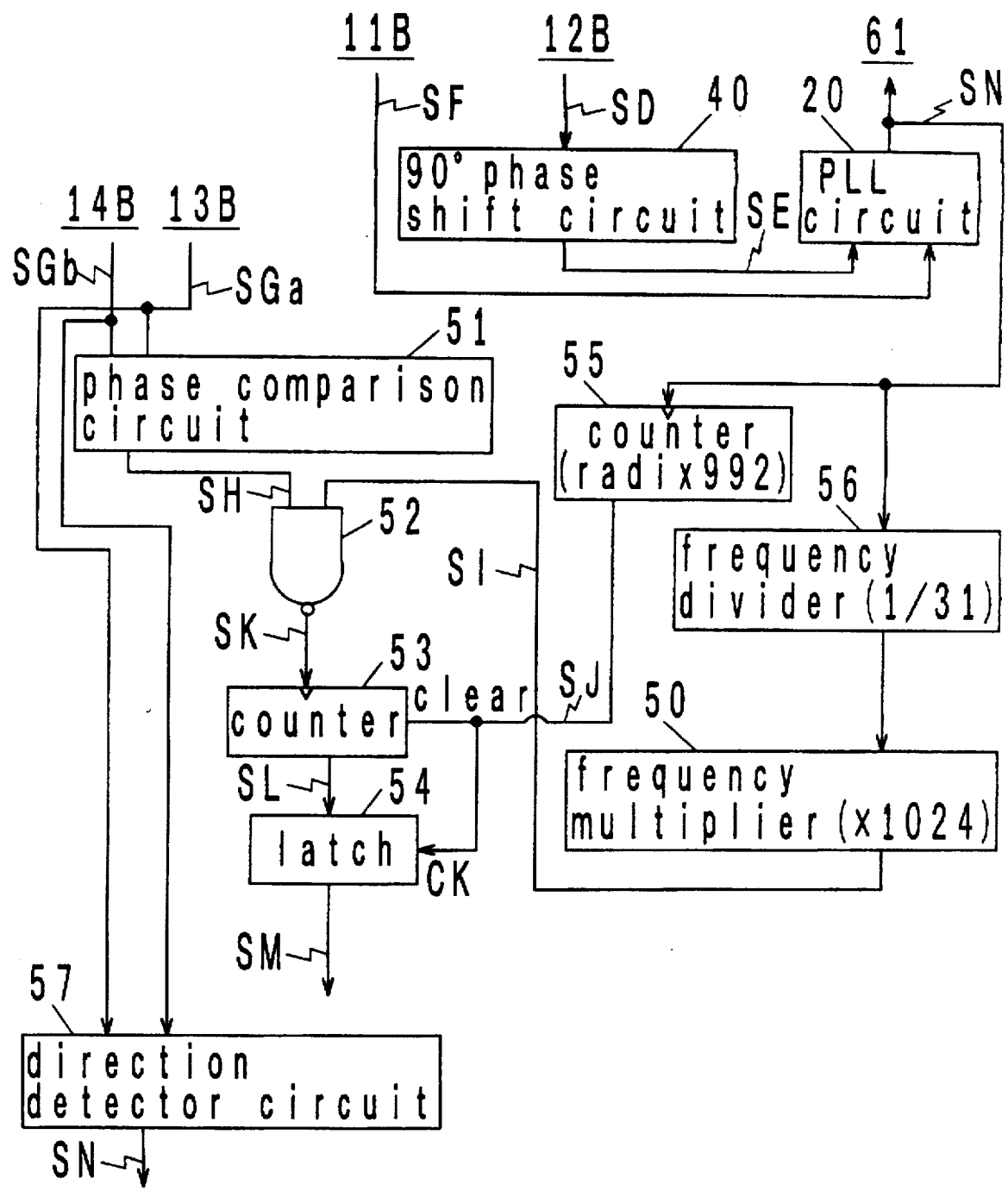
FIG. 1b is a block diagram of a remaining portion of the first embodiment, signal lines SGb, SGa, SF, SD, and SN shown in FIG. 1b being joined to corresponding signal lines designated by like characters as used in FIG. 1a to represent a block diagram of the entire arrangement of the first embodiment.
Figure 2:
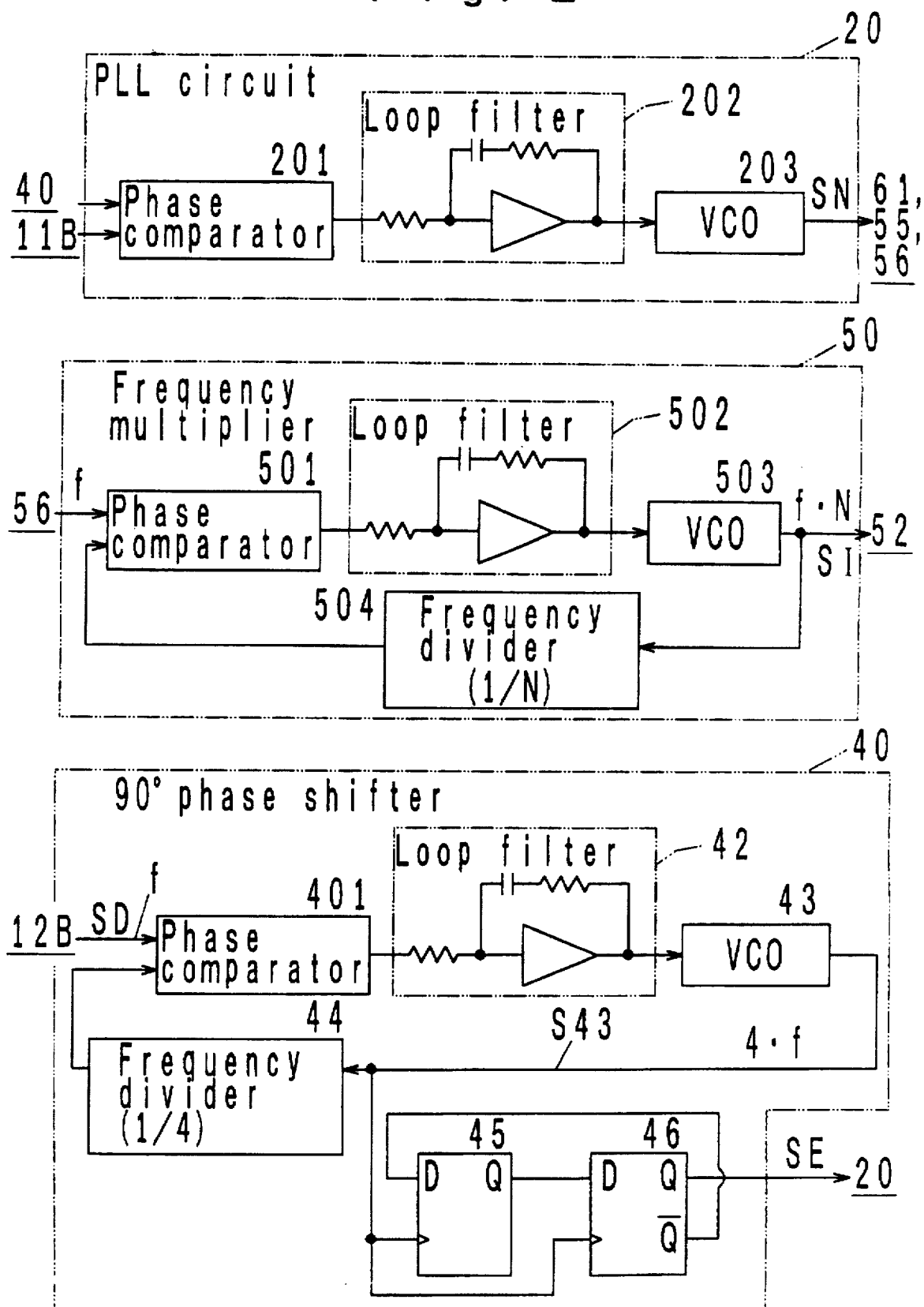
Figure 3:
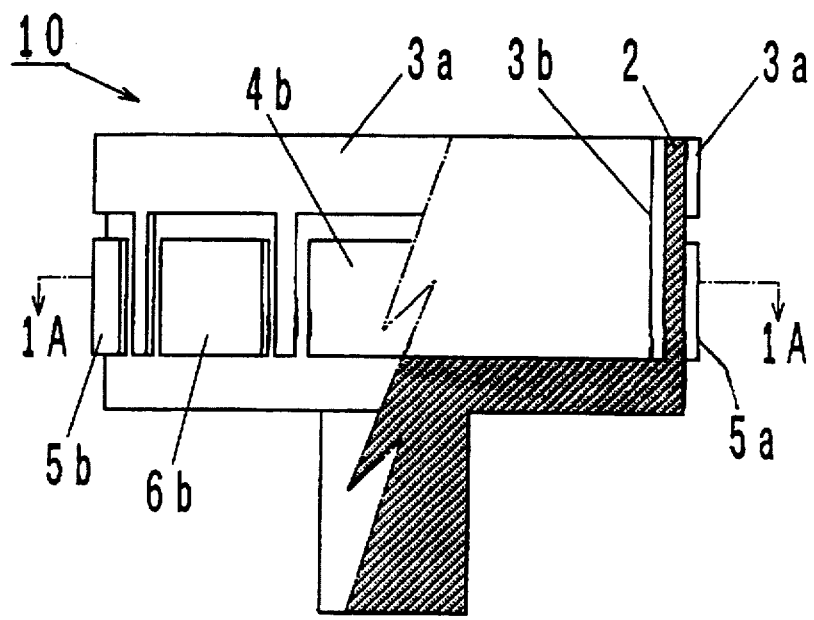
Figure 4:
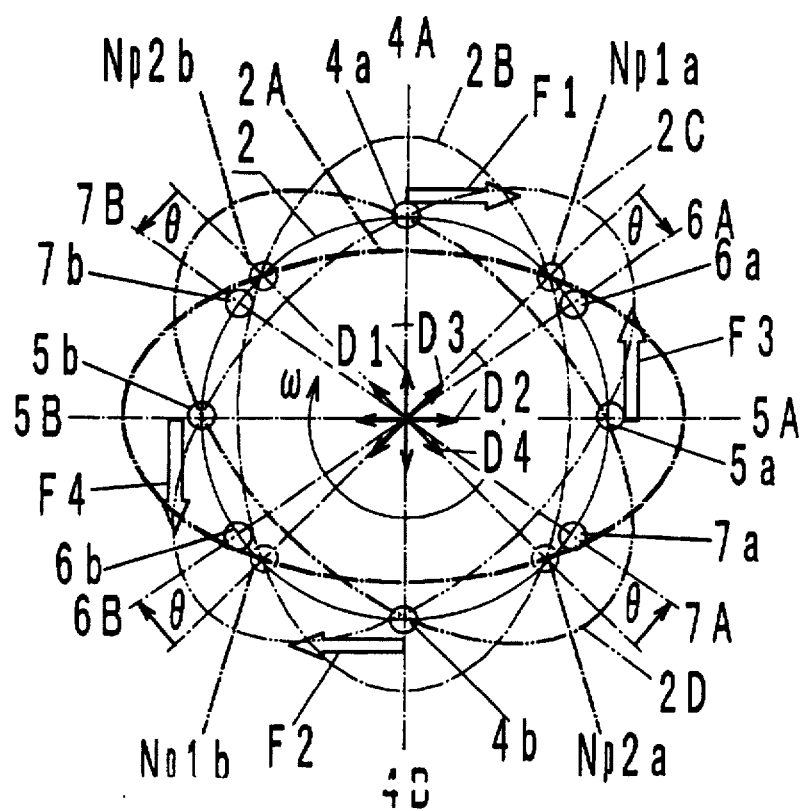
Figure 5A:
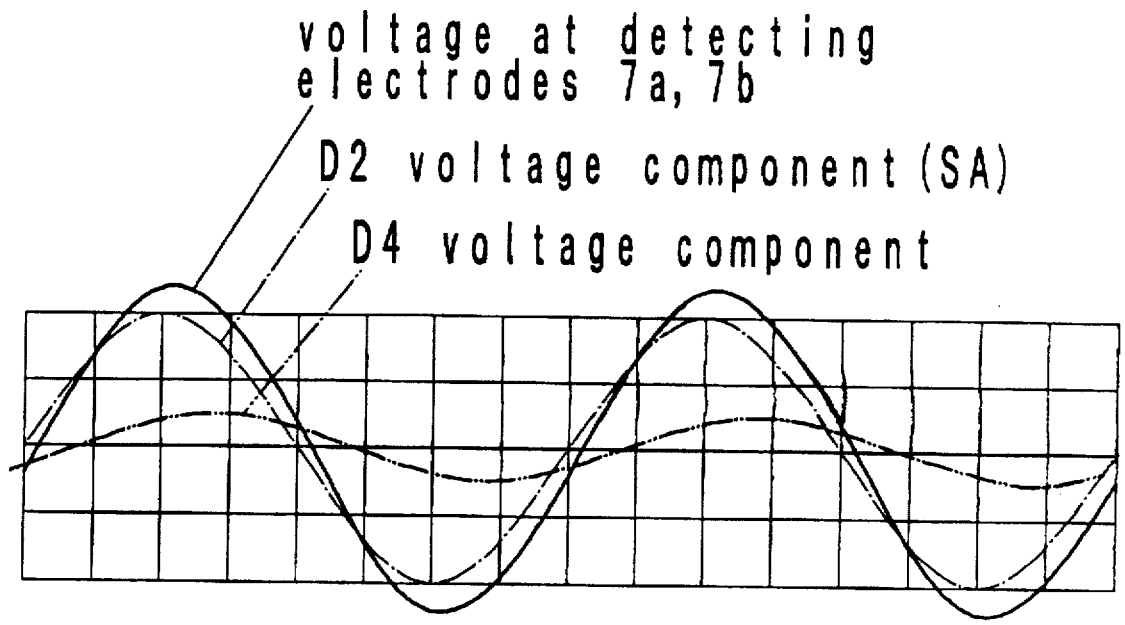
Figure 5B:
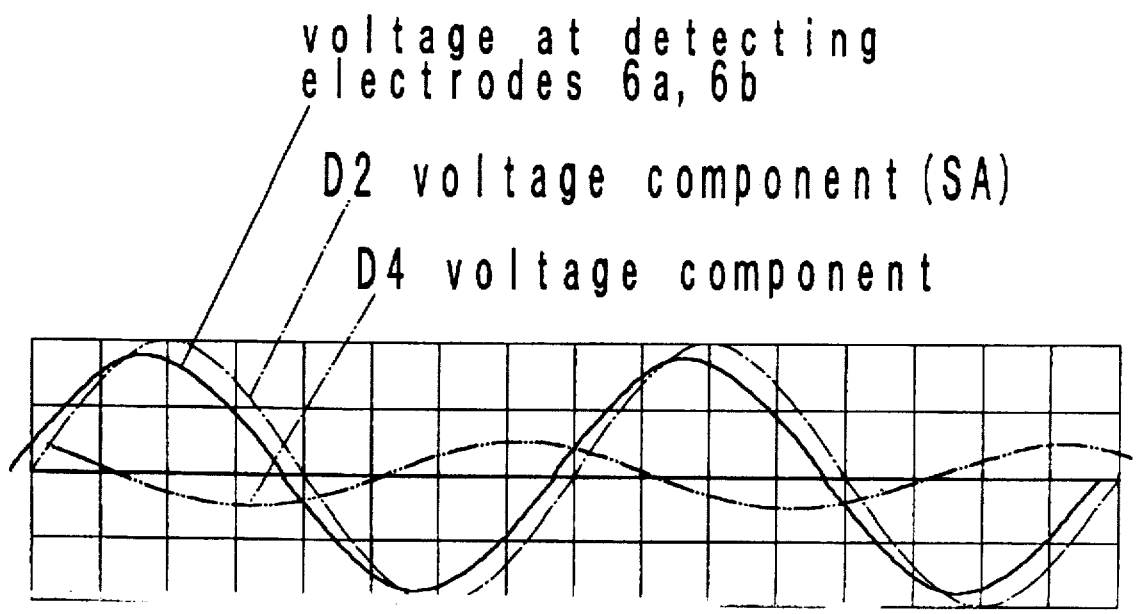
Figure 5C:
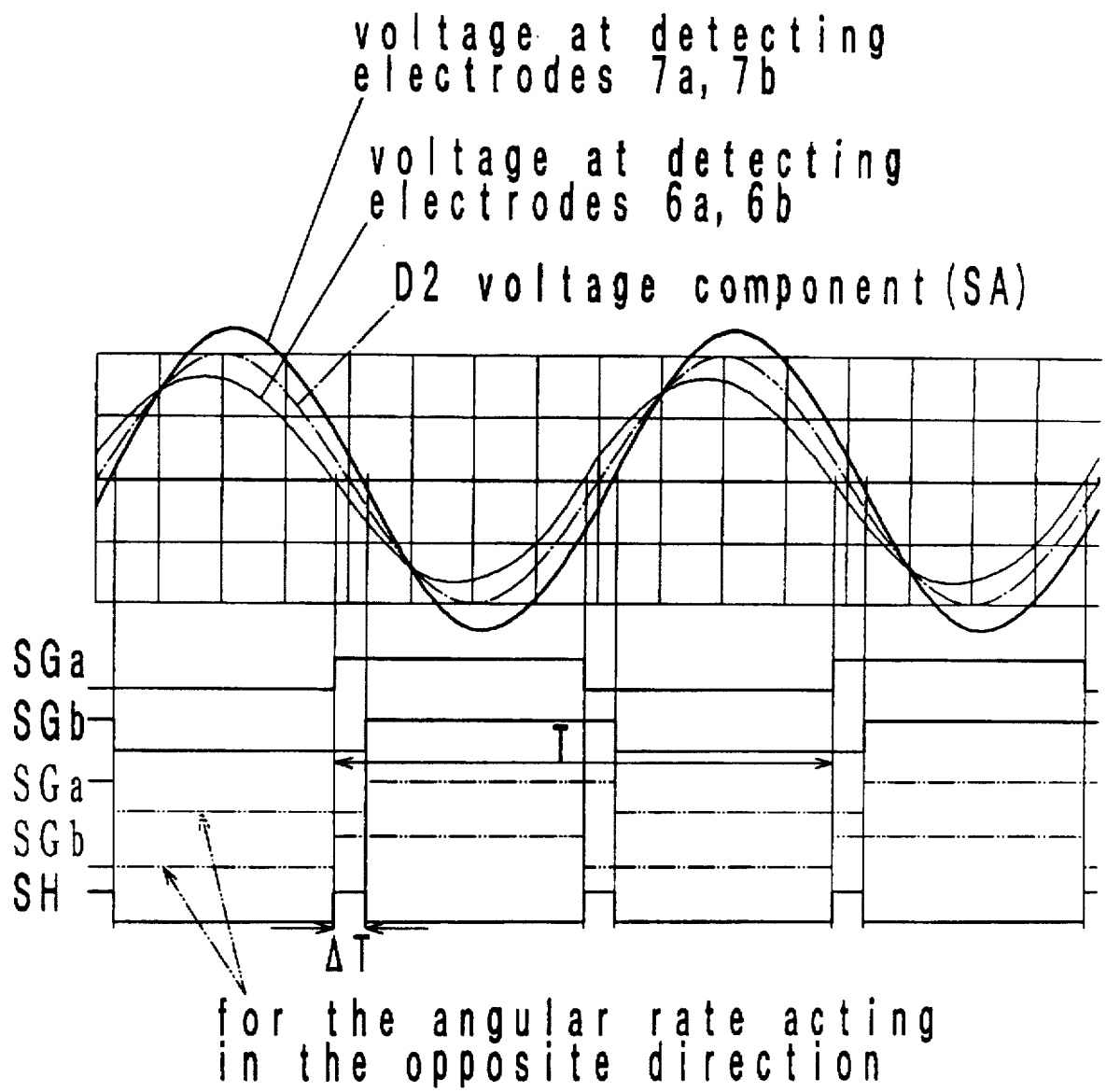
Figure 6:
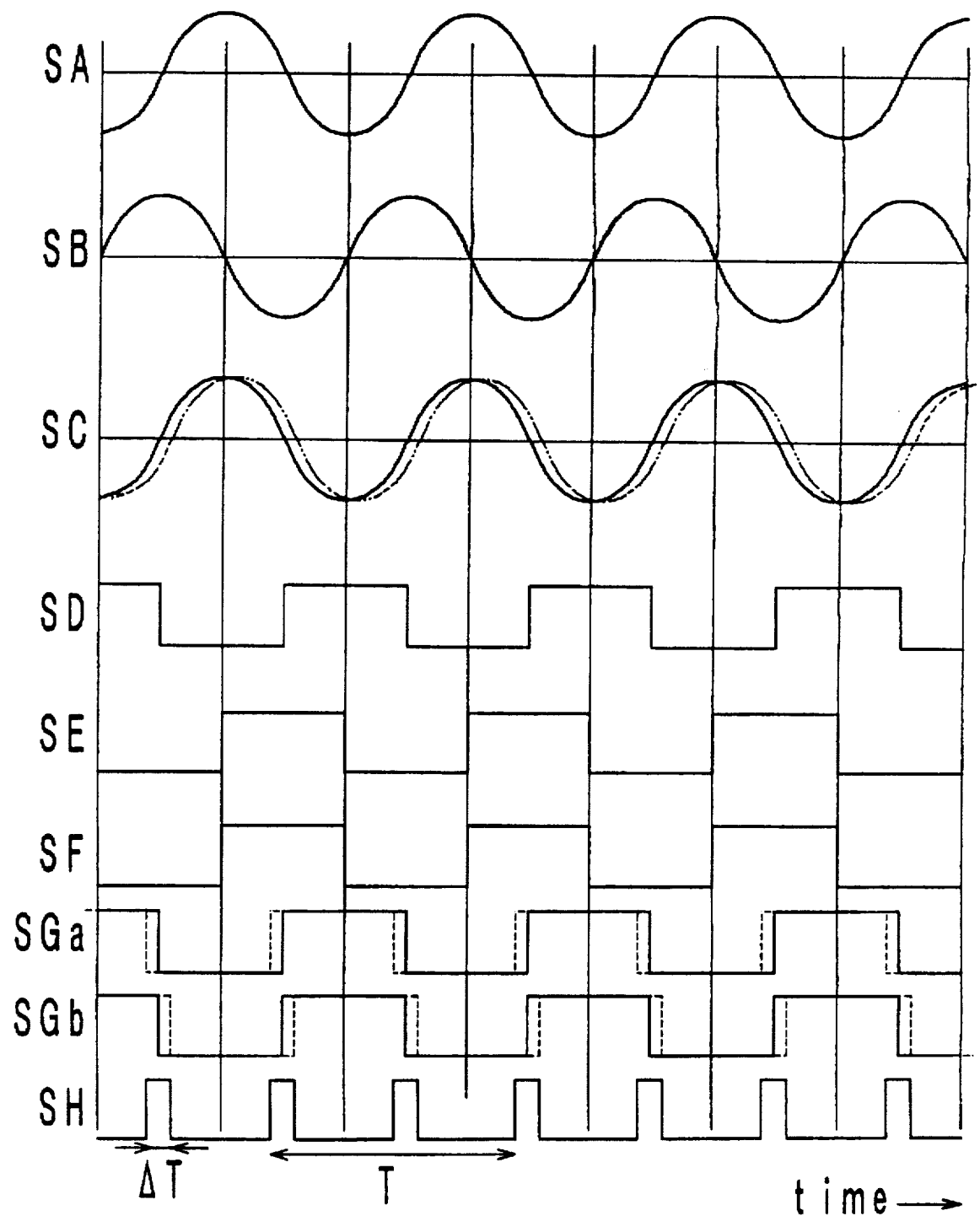
Figure 7:
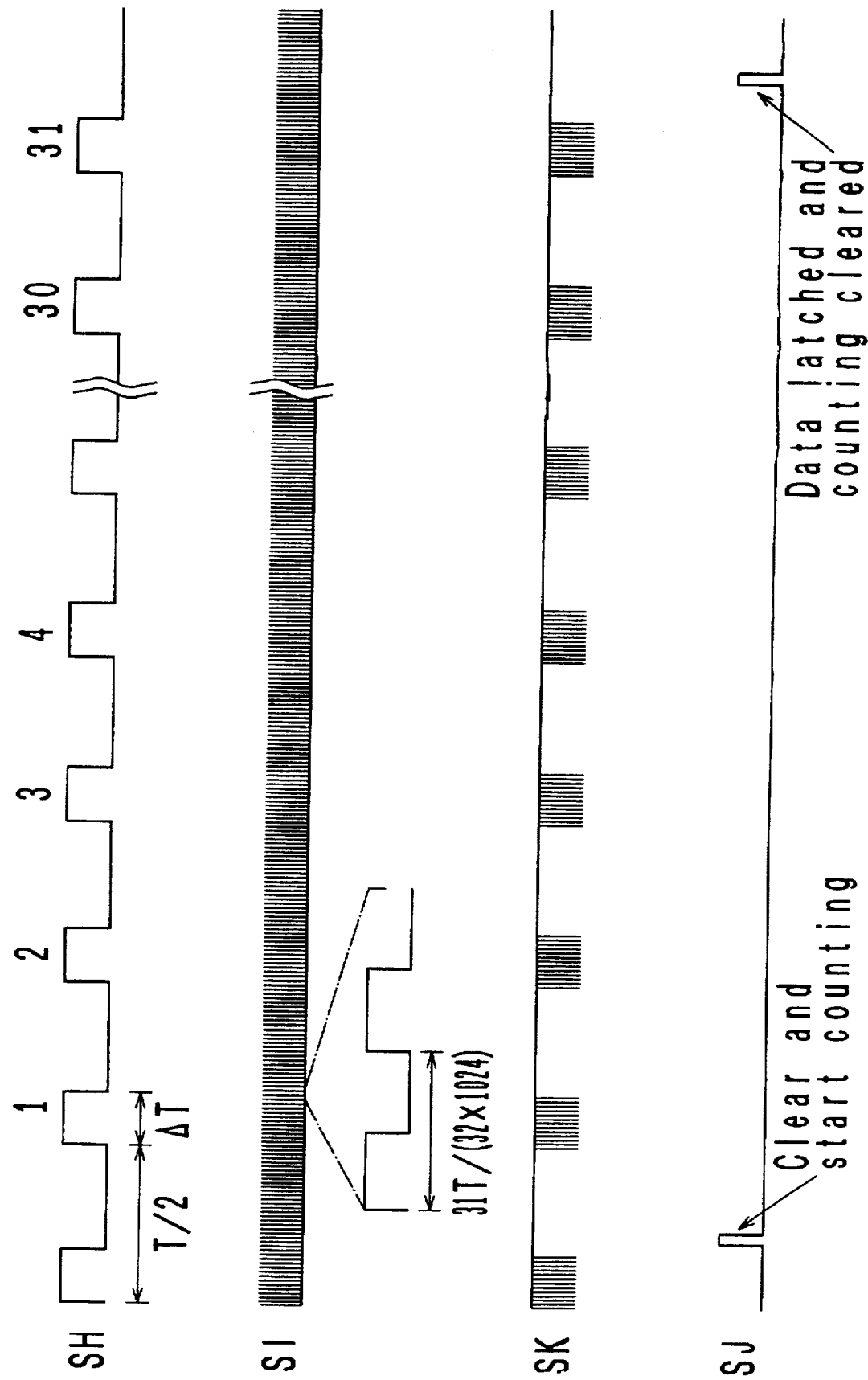
Figure 8:
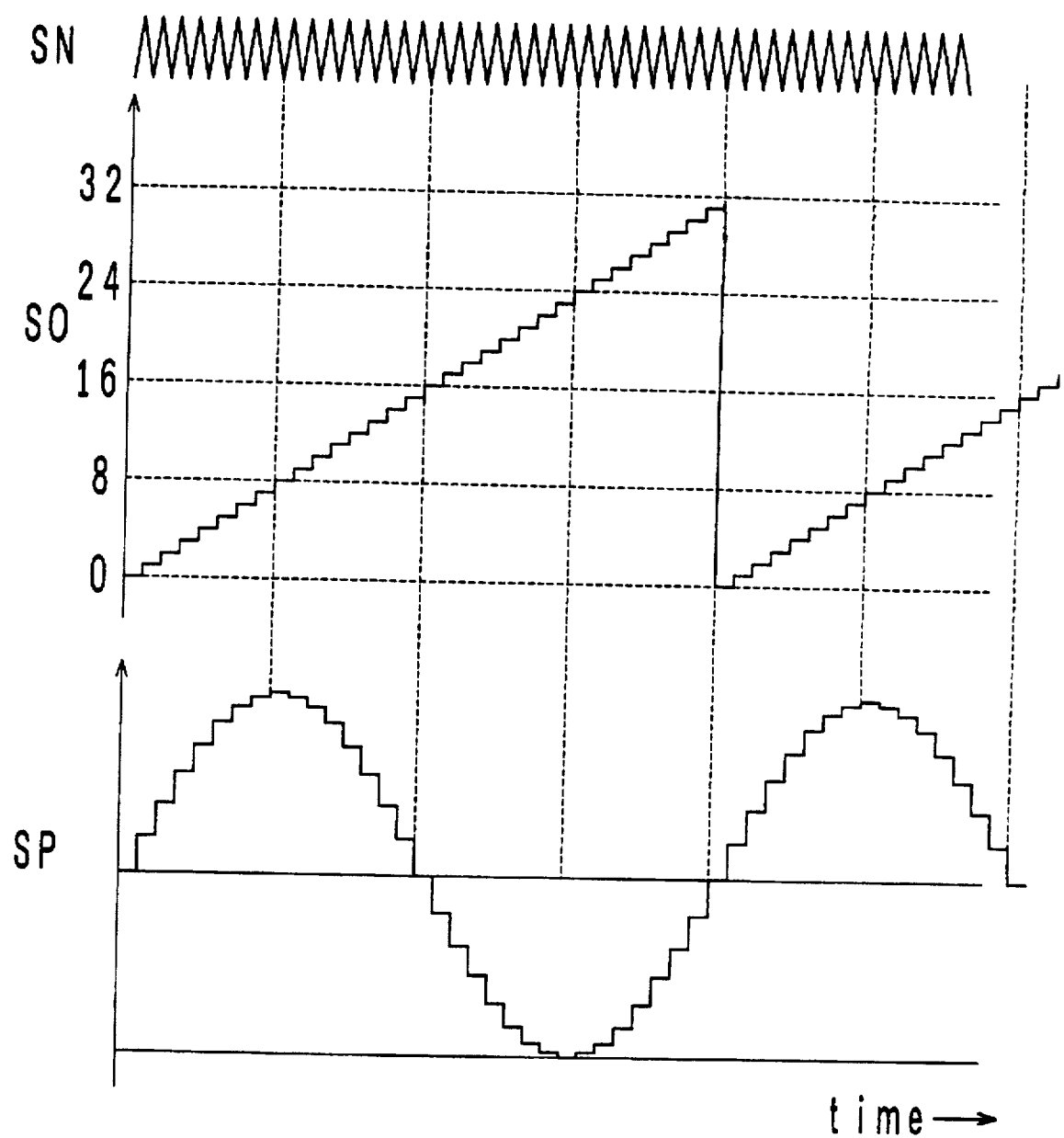
Figure 9:
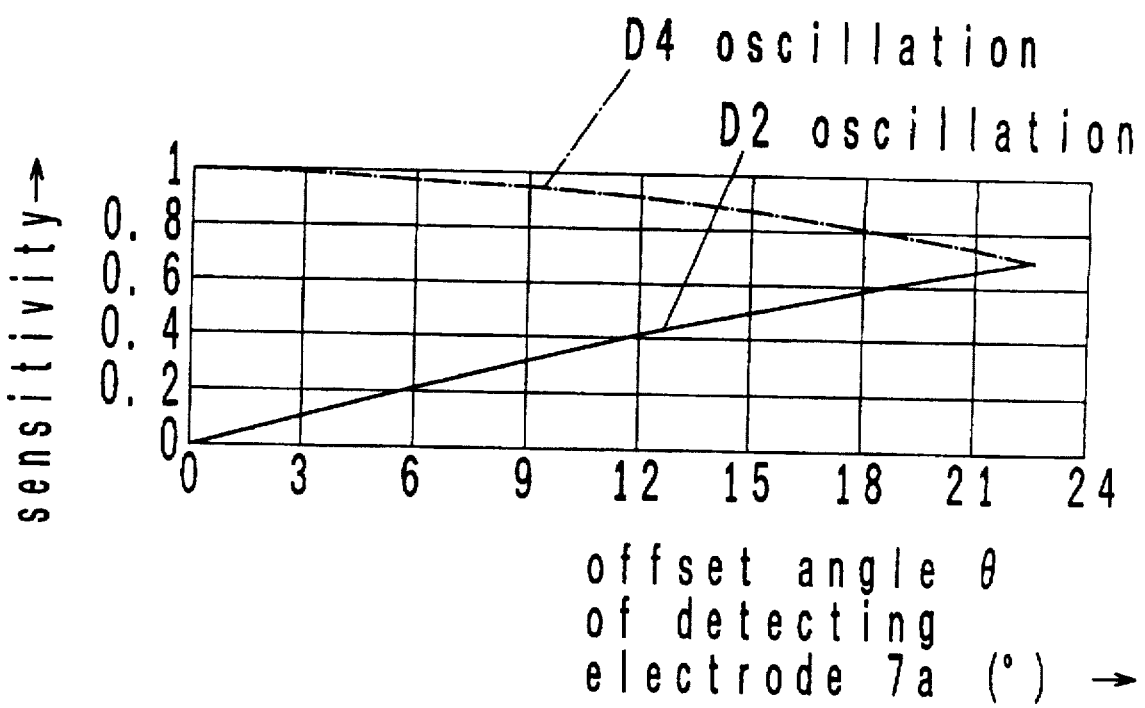
Figure 10A:
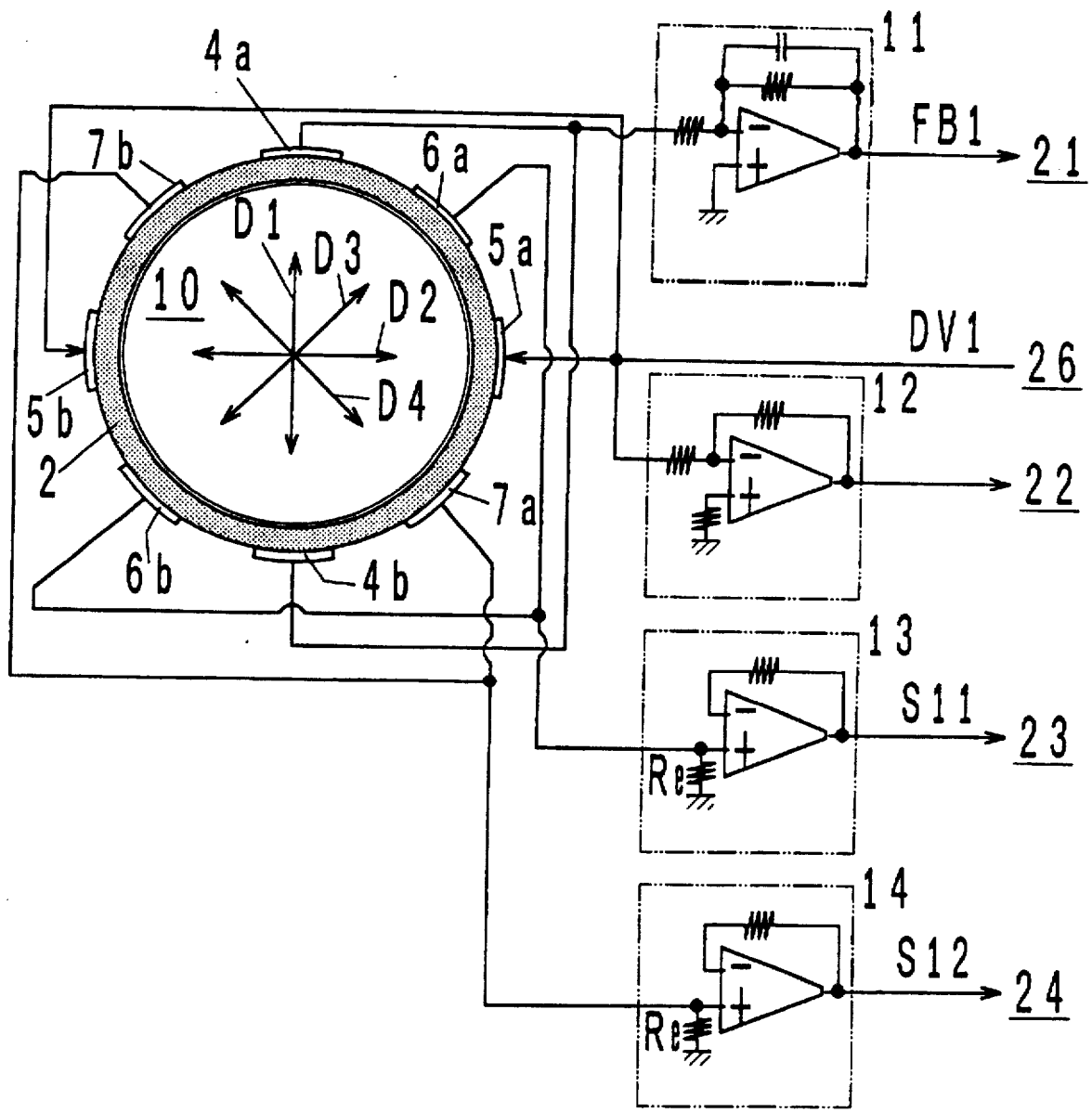
Figure 10B:
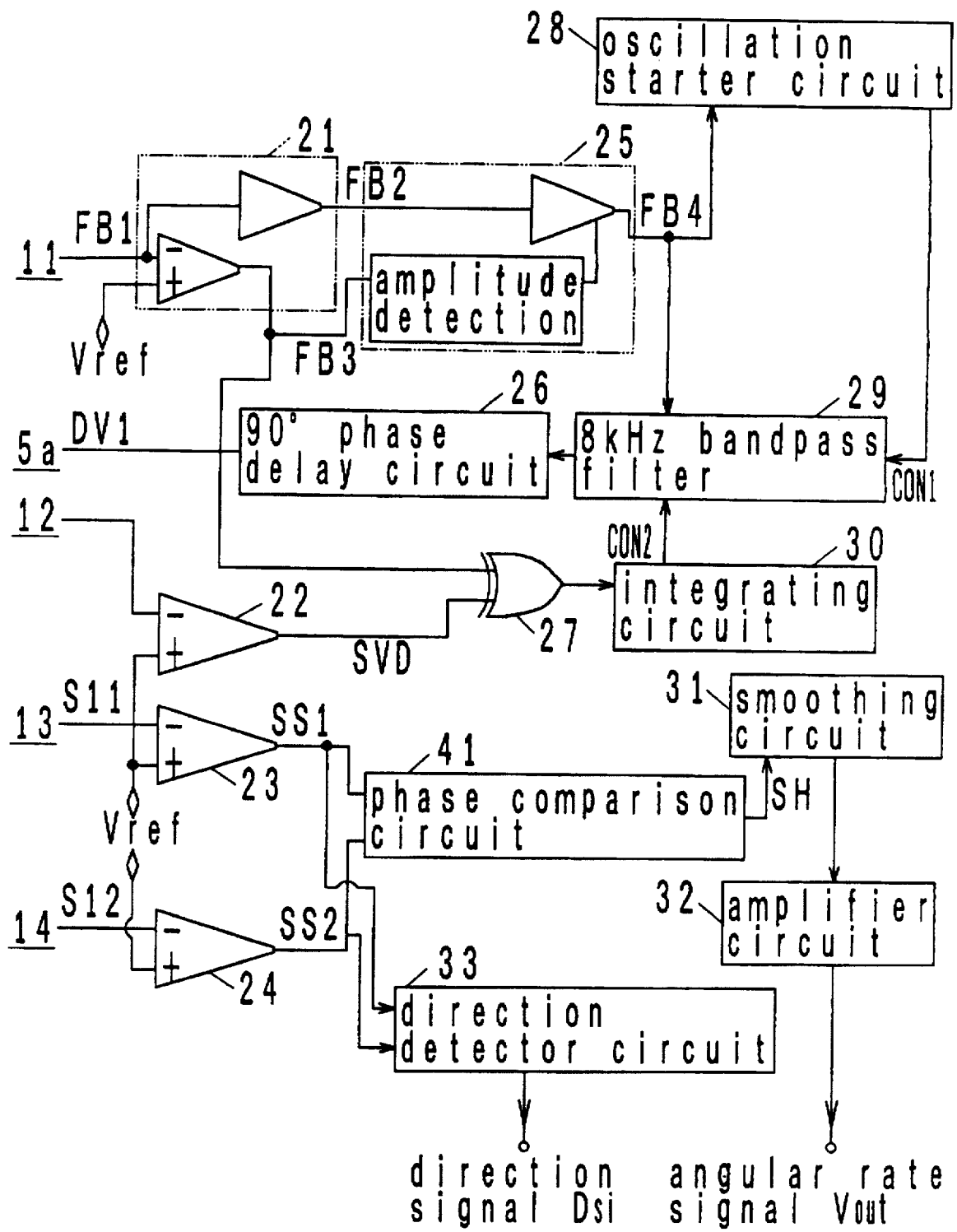
Figure 11A:
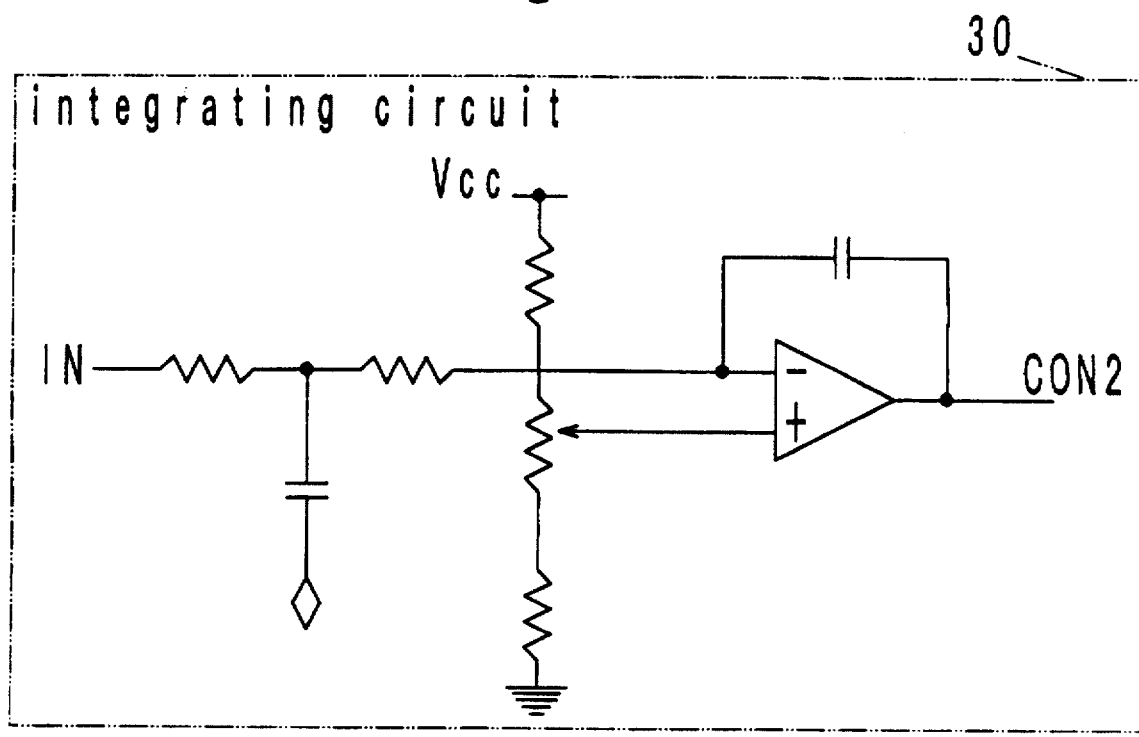
Figure 11B:
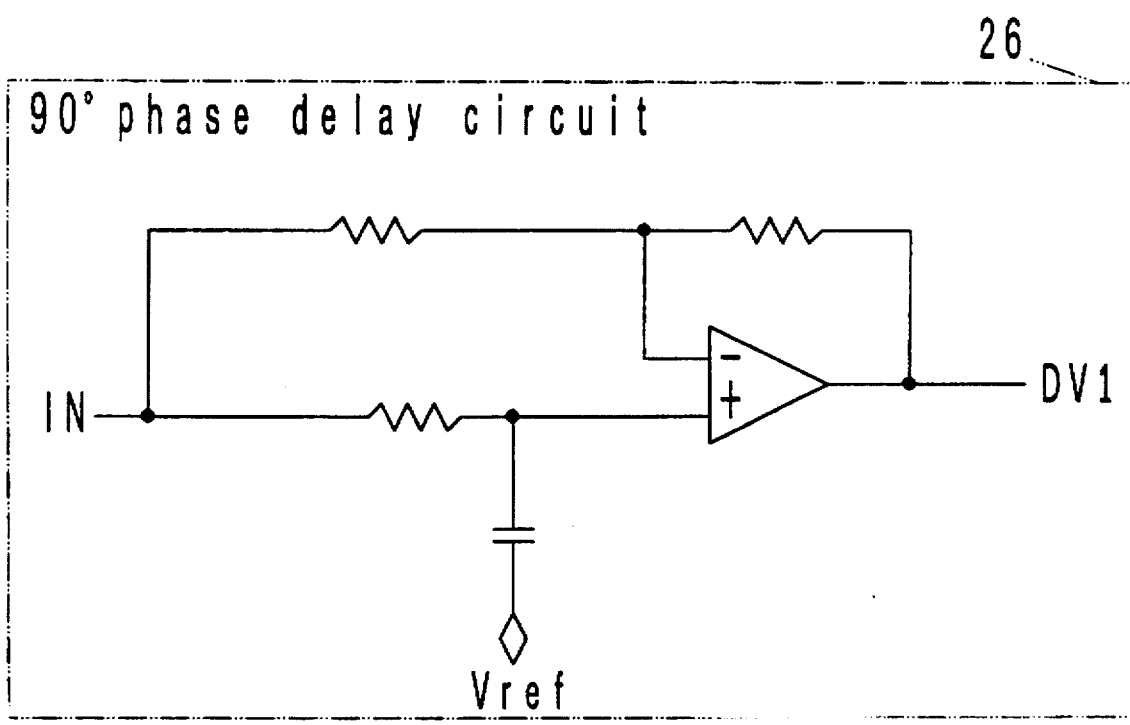
Figure 12A:
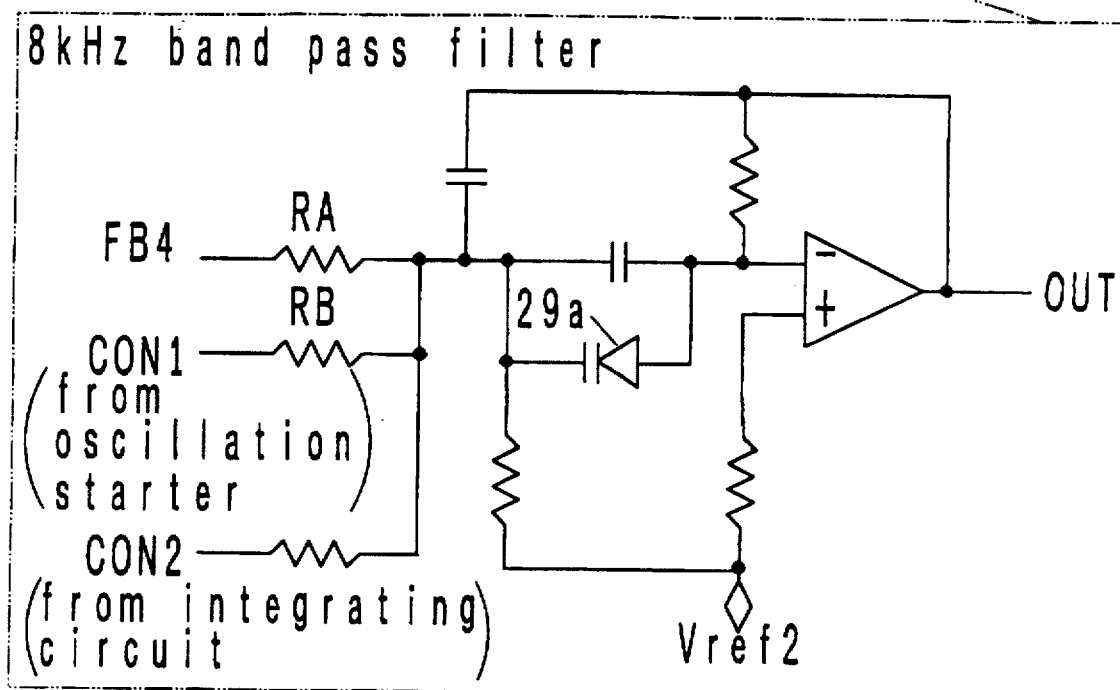
Figure 12B:
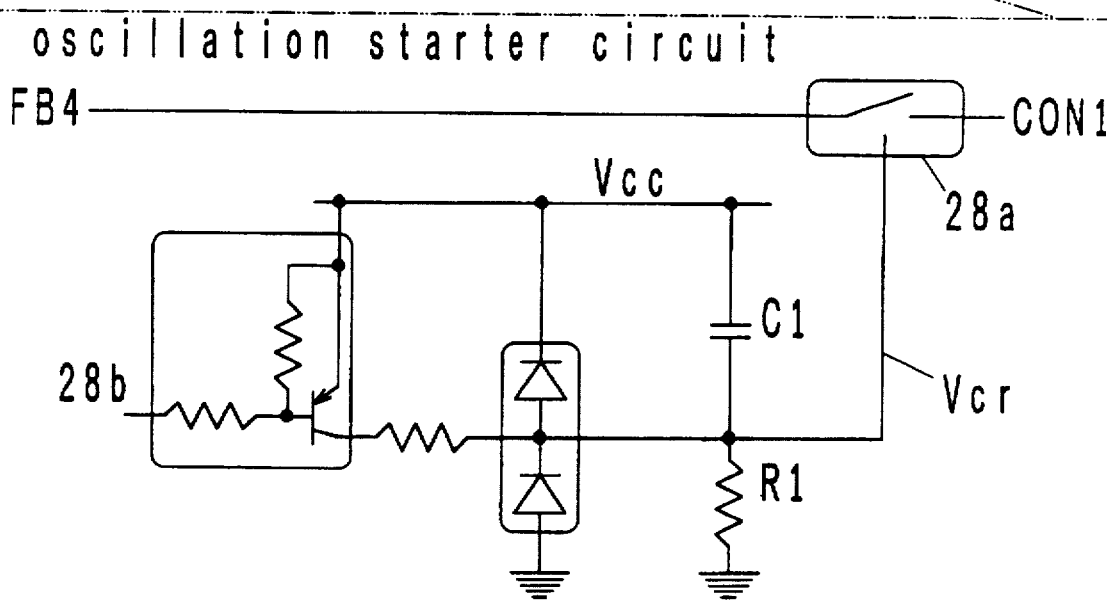
Figure 13:
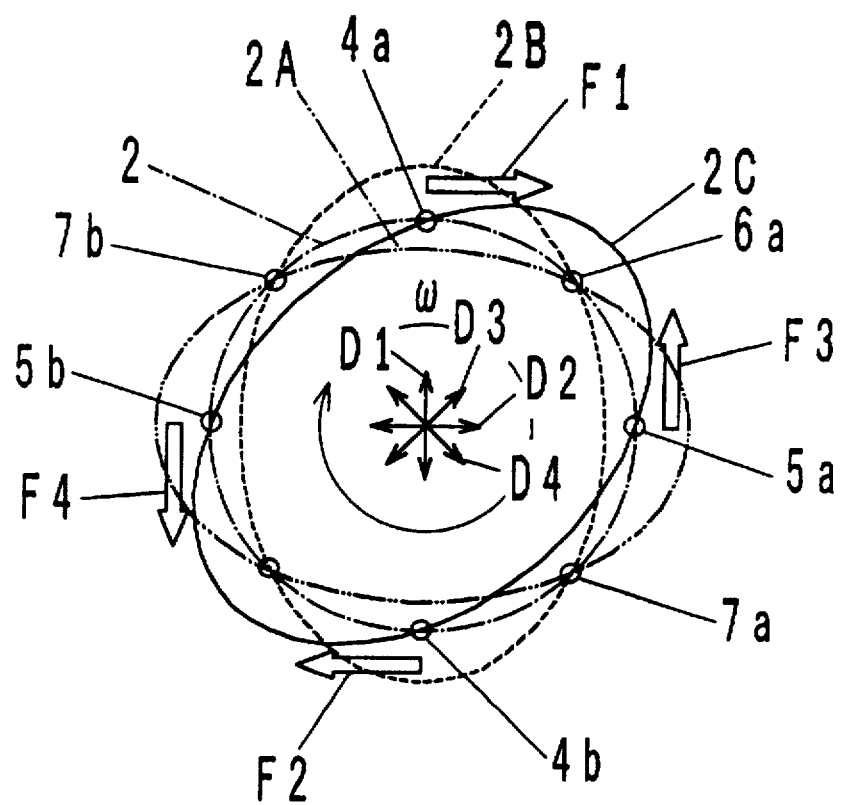
Figure 14:
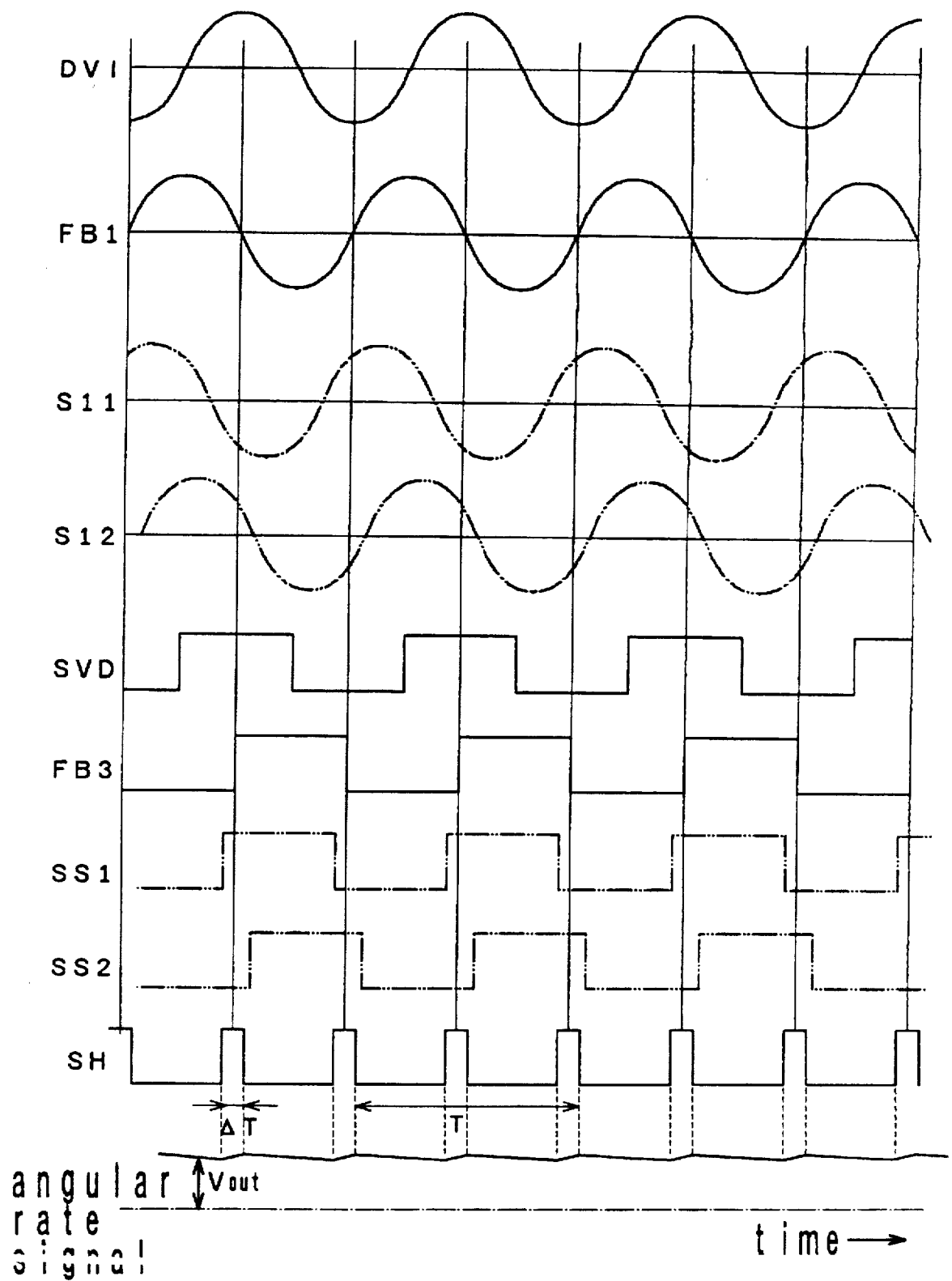
Figure 15A:
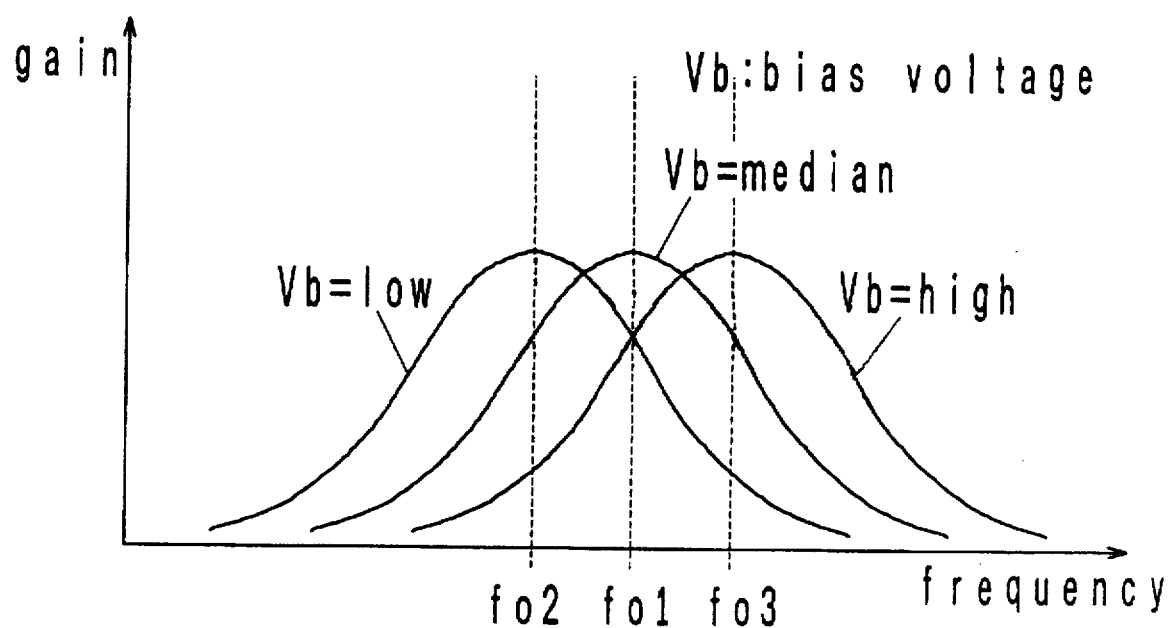
Figure 15B:
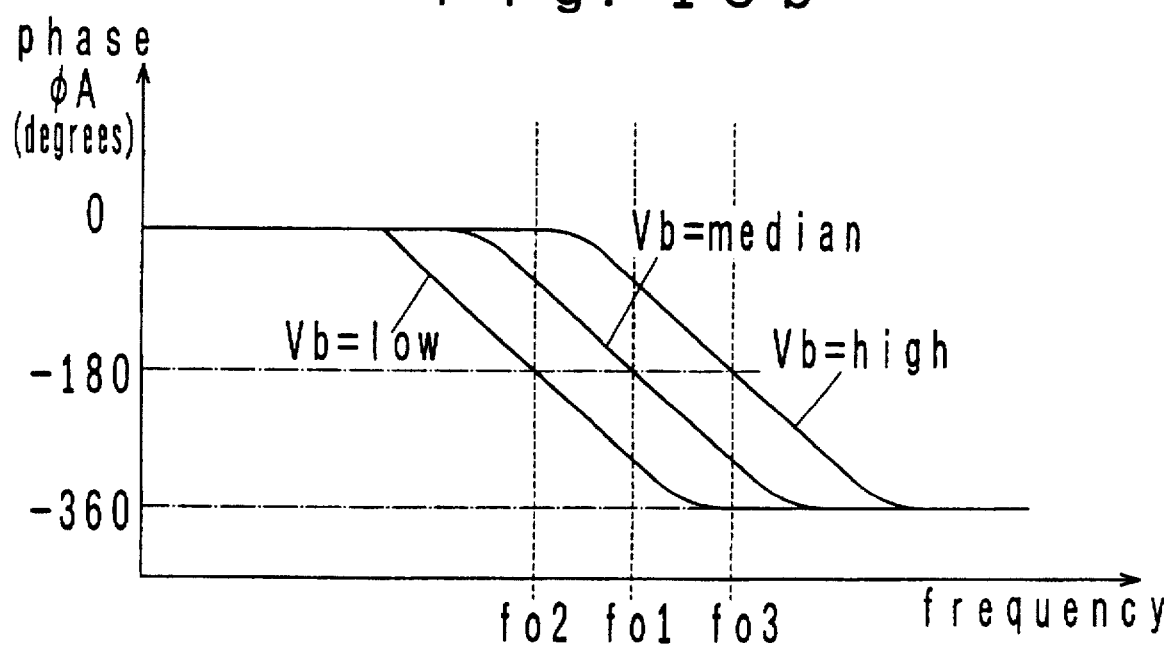
Figure 16:
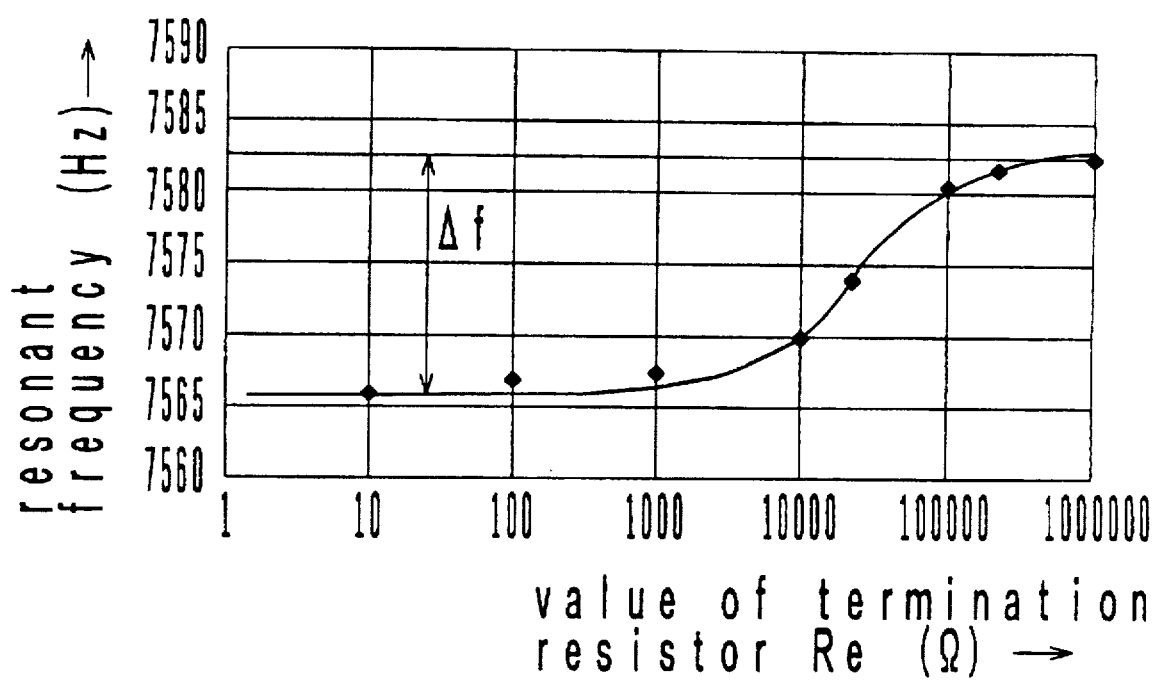
Figure 17:
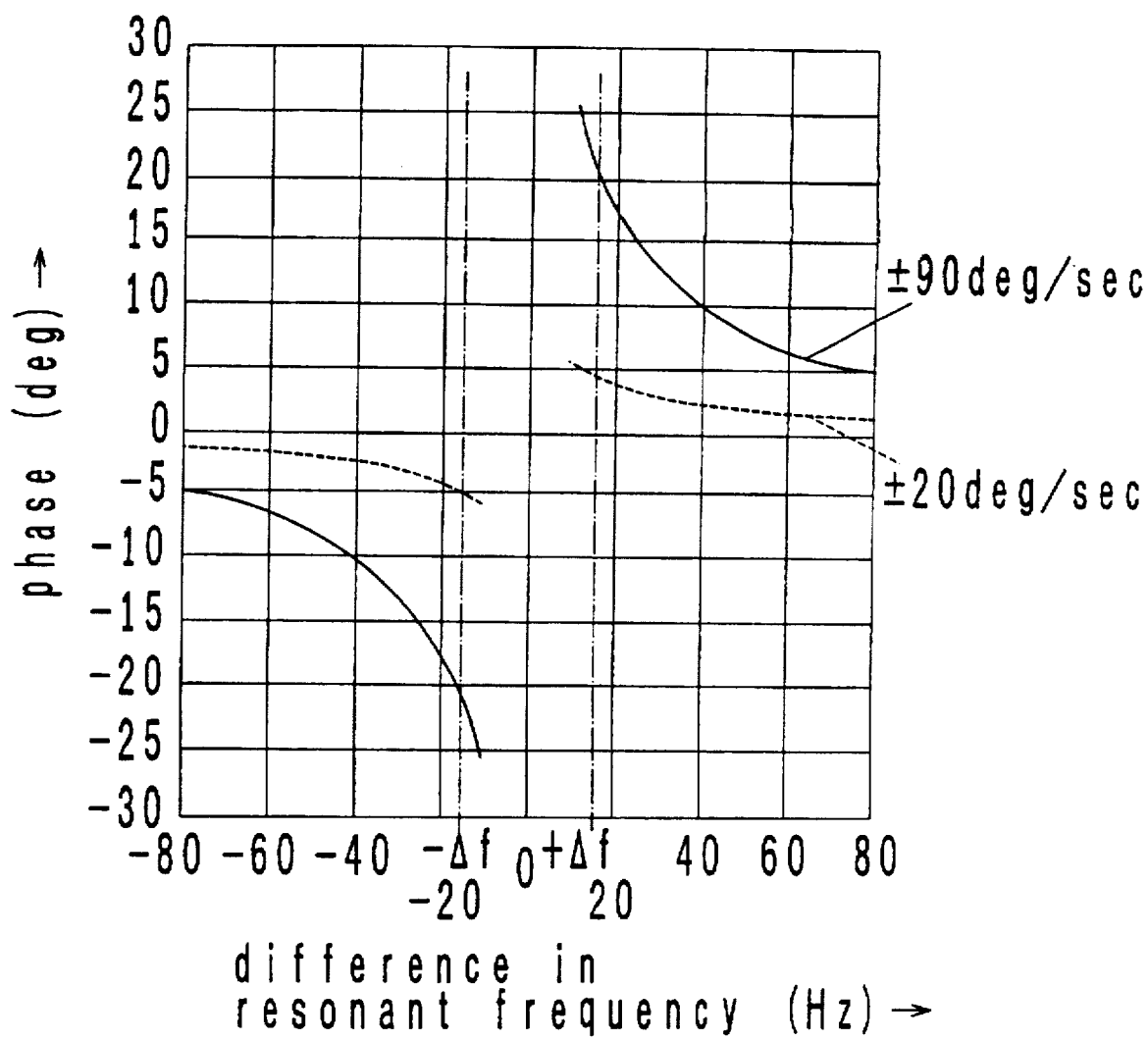
Figure 18:
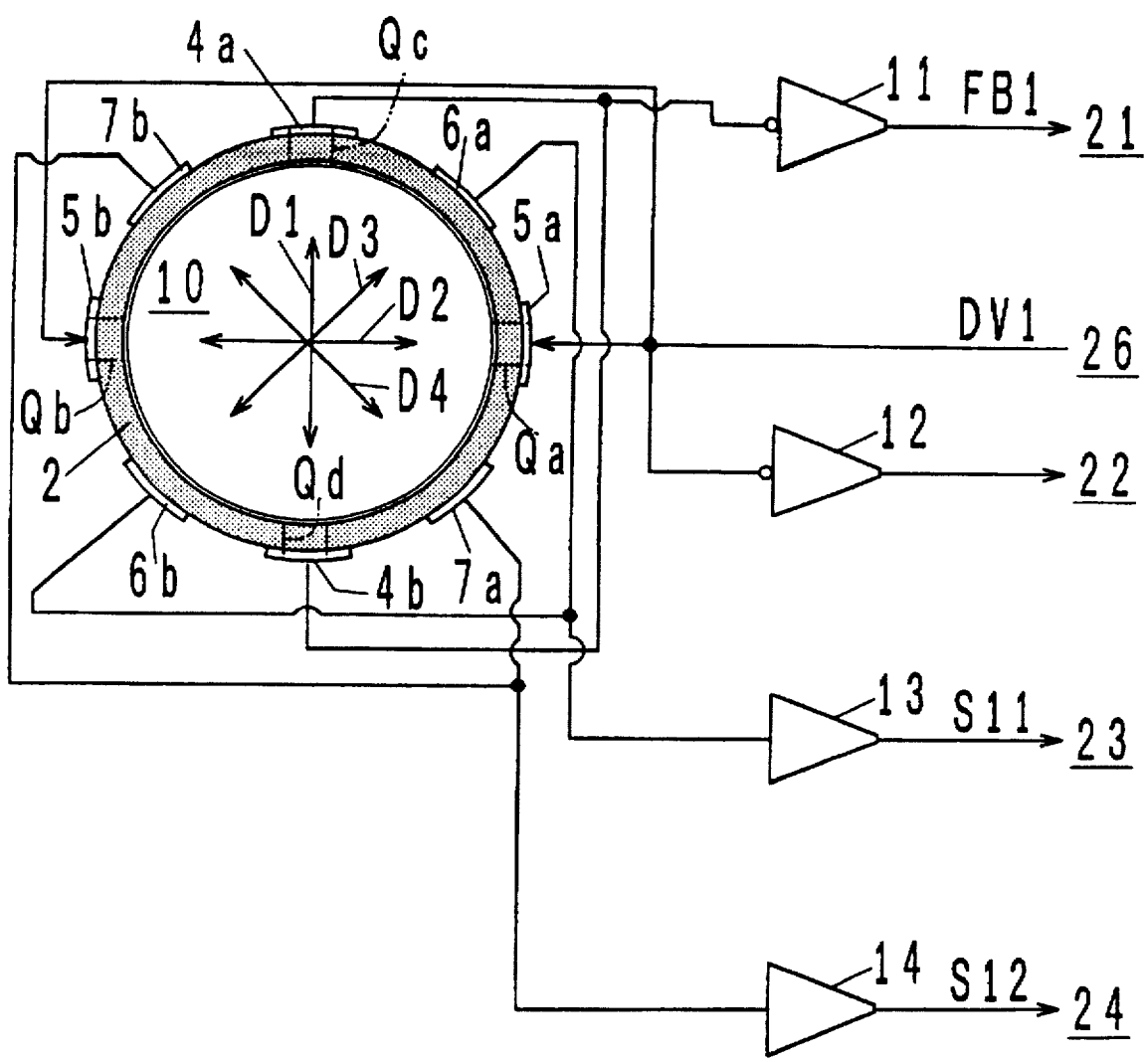
Figure 19:
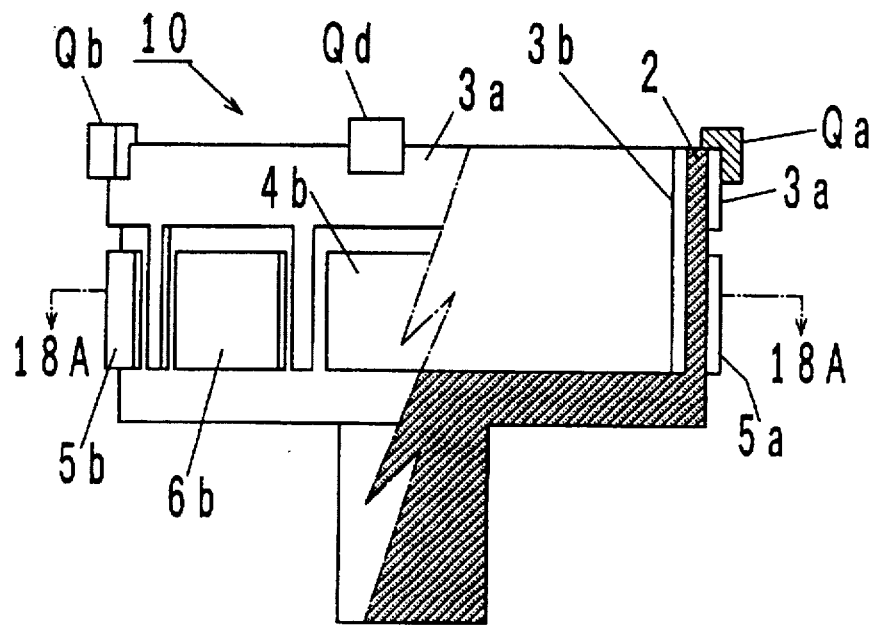
Figure 20:
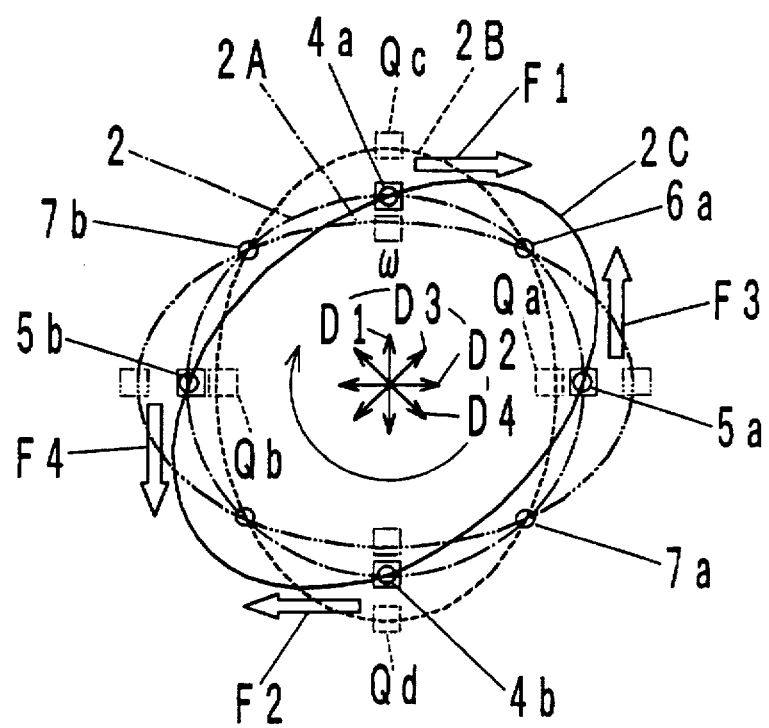
Figure 21:
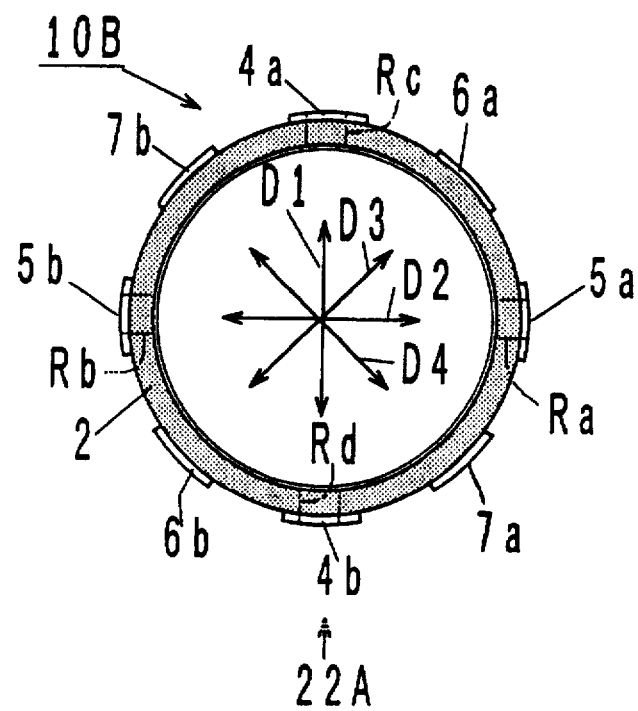
Figure 22:
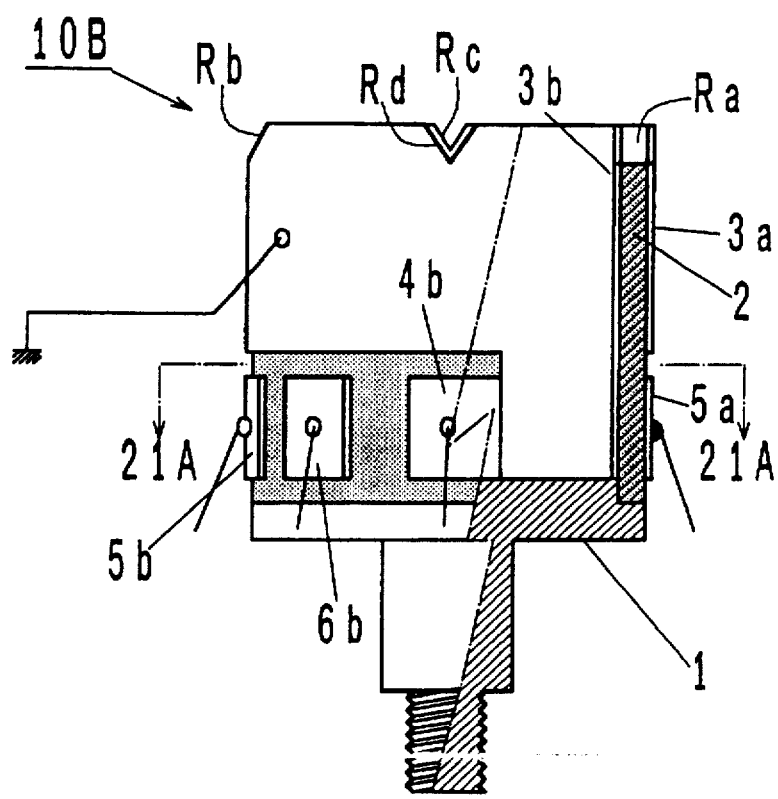

FIG. 2 is a block diagram of a PLL circuit 20, a frequency multiplier circuit 50 and a 90° phase shift circuit 40 shown in FIG. 1b;

FIG. 3 is a front view, partly in section, of a sensor element 10 shown in FIG. 1a, illustrating its appearance;

FIG. 4 is a plan view illustrating a manner of oscillation of a cylindrical piezoelectric body 2 shown in FIG. 1a;

FIG. 5a is a timing chart of a voltage developed at electrodes 7a, 7b shown in FIG. 1a and components contained in the voltage;

FIG. 5b is a timing chart of a voltage developed at electrodes 6a, 6b shown in FIG. 1a and components contained in the voltage;

FIG. 5c is a timing chart of voltages developed at electrodes 6a, 6b and 7a, 7b shown in FIG. 1a and components contained in these voltages as well as various signal voltages appearing at different portions of the electrical circuit shown in FIG. 1b;

FIG. 6 is a series of timing charts illustrating examples of signals appearing at various points in the circuit shown in FIGS. 1a and 1b;

FIG. 7 is a series of timing charts illustrating examples of signals appearing at various points in the circuit shown in FIG. 1b;

FIG. 8 is a series of timing charts illustrating examples of signals appearing at various points in the circuit shown in FIG. 1a;

FIG. 9 graphically illustrates a relationship (as calculated) between an offset angle θ of the electrode 7a shown in FIG. 1a and a normalized value of a voltage developed at the electrode 7a with the offset angle θ;

FIG. 10a is a block diagram of part of a second embodiment of the invention;

FIG. 10b is a block diagram of a remaining portion of the second embodiment, signal lines FB1, DV1, S11, and S12 shown in FIG. 10b being joined to corresponding signal lines designated by like characters in FIG. 10a to construct a block diagram of the entire arrangement of the second embodiment;

FIG. 11a is a circuit diagram of an integrator circuit 30 shown in FIG. 10b;

FIG. 11b is a circuit diagram of a 90° phase delay circuit 26 shown in FIG. 10b;

FIG. 12a is a circuit diagram of a bandpass filter 29 shown in FIG. 10b;

FIG. 12b is a circuit diagram of an oscillation starter circuit 28 shown in FIG. 10b;

FIG. 13 is a plan view illustrating a manner of oscillation of a cylindrical piezoelectric body 2 shown in FIG. 10a;

FIG. 14 is a series of timing charts illustrating signals appearing at various points in the circuit shown in FIG. 10b;

FIG. 15a graphically illustrates a frequency/gain response of the bandpass filter 29 shown in FIG. 10b;

FIG. 15b graphically illustrates a frequency/input-output phase difference response of the bandpass filter 29 shown in FIG. 10b;

FIG. 16 graphically illustrates a relationship between the value of resistor Re of an amplifier 13 shown in FIG. 10a and the resonant frequency of the cylindrical piezoelectric body 2 in the direction D3;

FIG. 17 graphically illustrates a relationship between a difference between the resonant frequencies in the direction D2 and D3 of the cylindrical piezoelectric body 2 shown in FIG. 10a and a phase displacement of a voltage S11 developed at the detecting electrode 6a relative to an exciting voltage DV1 applied to the exciting electrode 5a, a curve shown in solid line corresponding to an angular rate of 90°/sec applied to the cylindrical piezoelectric body 2 and a curve shown in dotted lines corresponding to an angular rate of 20°/sec applied;

FIG. 18 is a cross section of a sensor element 10 according to a third embodiment of the invention;

FIG. 19 is a front view, parlty in section, of the sensor element 10 of the third embodiment, illustrating its appearance;

FIG. 20 is a plan view illustrating a manner of oscillation of the cylindrical piezoelectric body 2 shown in FIGS. 18 and 19;

FIG. 21 is a cross section of a modification 10B of the sensor element of the third embodiment; and FIG. 22 is a front view, partly in section, of the sensor element 10B shown in FIG. 21, illustrating its appearance.

DESCRIPTION OF THE PREFERRED EMBODIMENTS

First Embodiment

An overall arrangement of angular rate detector according to a first embodiment of the invention is obtained by joining the FIGS. 1a and 1b together. The appearance of a sensor element 10 shown in FIG. 1a is indicated in FIG. 3. The sensor element 10 shown in FIG. 1a corresponds to a section taken along a line 1A—1A shown in FIG. 3. The sensor element 10 includes a cylindrical piezoelectric body 2, having its lower end integrally formed with an element base including a disc at its top end and a limb in the form of around rod which continues from the bottom surface of the disc. A substantially upper half of the outer peripheral surface of the cylindrical piezoelectric body 2 is covered by a reference potential electrode 3a which is connected to the electrical ground of the detector while eight electrode segments having an identical configuration are cemented to the lower half of the outer peripheral surface substantially at a pitch of 45°. The inner peripheral surface of the cylindrical piezoelectric body 2 is covered by a reference potential electrode 3b which assumes the same potential as the electrode 3a (circuit reference potential).

In the electrical circuit shown in FIG. 1a, the eight electrode segments are connected such that a pair of electrode segments 4a, 4b, which are disposed opposite to each other along a first diametrical direction D1, act as feedback electrodes, another pair of electrode segments 5a, 5b, which are disposed opposite to each other along a second diametrical direction D2 which is orthogonal to the direction D1, act as exciting electrodes, and a further pair of electrode segments 6a, 6b, which are disposed opposite to each other on a direction which is adjacent to a bisector between the directions D1 and D2 or a third diametrical direction D3 which is disposed at an angle of 45° from the direction D1, but which is offset therefrom by θ toward electrode segment 5a, act as a first set of detecting electrodes. Still another pair of electrode segments 7a, 7b, which are disposed opposite to each other along a direction which is adjacent to a fourth diametrical direction D4, orthogonal to the direction D3, but which is offset by θ toward the electrode segment 5b, act a second set of detecting electrodes.

An alternating voltage generated by an oscillator circuit (12A, 12B, 40, 20, 60) is applied across the exciting electrodes 5a, 5b and the reference potential electrodes 3a, 3b of the sensor element 10, whereupon the cylindrical piezoelectric body 2 undergoes a deformation and an oscillation. A signal SF which appears at feedback electrodes 4a, 4b in response to the oscillation of the cylindrical piezoelectric body 2 is fed back to the oscillator circuit. By utilizing the signal which is fed back, the frequency of an output signal from the oscillator circuit is automatically adjusted so that the cylindrical piezoelectric body 2 oscillates at a frequency which is coincident with the resonant frequency fm thereof.

When the power supply to the oscillator circuit is turned on, a certain voltage is applied across the exciting electrodes 5a, 5b and reference potential electrodes 3a, 3b, and in response thereto, the cylindrical piezoelectric body 2 expands or shrinks in the second diametrical direction D2. The deformation of the body 2 produces a voltage across the feedback electrodes 4a, 4b and reference potential electrodes 3a, 3b. The cylindrical piezoelectric body 2 at the peak of shrinkage and at the peak of expansion are shown exaggerated by dotted lines 2B and phantom lines 2A in FIG. 4 as it expands and shrinks during the oscillation thereof in the second diametrical direction D2 at the resonant frequency fm.

It will be noted from the FIG. 4 that the expansion/shrinkage in the second diametrical direction D2 corresponds to the shrinkage/expansion in the first diametrical direction D1, and the peak of shrinkage in the direction D2 corresponds to the peak of expansion in the direction D1. Accordingly, in this example, the cylindrical piezoelectric body 2 oscillates in cruciform directions (D1 and D2). This represents the oscillation of the cylindrical piezoelectric body 2 (first oscillation) as it is excited by the oscillator circuit.

When the cylindrical piezoelectric body 2 is oscillating in the cruciform directions (D1 and D2; see phantom lines 2A and dotted line 2B in FIG. 4), since the detecting electrodes 6a, 6b, 7a, 7b are located adjacent to nodes Np1a, Np1b, Np2a, Np2b, a voltage which is developed across such detecting electrodes and the reference potential electrodes 3a, 3b is low. It will be understood that no voltage appears if these electrodes were located at the nodes of the oscillation, but since their locations are offset by θ from the nodes toward anti-nodes (positions indicated at 5a and 5b), a certain magnitude of voltage is developed.

When the cylindrical piezoelectric body 2 rotate, for example, in a clockwise direction ω as shown in FIG. 4, Coriolis forces F1 to F4 are produced as a result of such rotation and the oscillation of the cylindrical piezoelectric body 2, whereby an oscillation in directions D3 and D4 (second oscillation) appears. Thus the direction of oscillation (D2) of the cylindrical piezoelectric body 2 is twisted toward the fourth diametrical direction D4, as indicated by phantom lines 2D in FIG. 4, thus increasing the magnitude of the voltage developed at the detecting electrodes 6a, 6b and causing a shift in the phase of the voltage (alternating voltage). The magnitude of the phase shift corresponds to the angular rate ω of rotation which the cylindrical piezoelectric body 2 experiences. Accordingly the arrangement shown in FIGS. 1a, 1b is provided with a circuit which determines the magnitude of the phase shift of the signal which appears at the detecting electrodes 6a, 6b. When the angular rate in the clockwise direction ω is applied, the phase of the signal which appears at the detecting electrodes 7a, 7b will lead in accordance with the angular rate while the signal which appears at the detecting electrodes 6a, 6b will be lagging in phase. Conversely, when the angular rate in the counter-clockwise direction is applied, the signal appearing at the detecting electrodes 7a, 7b will be lagging in phase and the signal appearing at the detecting electrodes 6a, 6b will be leading in phase in accordance with the magnitude of the angular rate.

Referring to FIGS. 1a and 1b, the oscillation circuit which is to excite the cylindrical piezoelectric body 2 will be described. A PLL (phase locked loop) circuit 20 has a pair of input terminals which receive signals SE and SF. The PLL circuit 20 delivers a signal which, after passing through a pseudo-sinusoidal wave generator circuit 60 and a low pass filter 64, is applied as a drive signal SA to the exciting electrodes 5a, 5b. The drive signal SA is also input through a low pass filter 12A to an inverter 12B with a Schmidt trigger. The inverter 12B delivers a binary signal SD at its output, which is passed through a 90° phase shift circuit 40 to be converted into a signal SE, which is phase lagging by 90° with respect to the signal SD.

A signal appearing at the feedback electrodes 4a, 4b is passed through a low pass filter 11A to be input to an inverter 11B with a Schmidt trigger. The inverter 11B delivers a binary signal SF at its output, which is applied to one input terminal of the PLL circuit 20.

The pseudo-sinusoidal wave generator circuit 60 includes a counter 61, read-only memory (ROM) 62, and a D/A converter 63. The counter 61 has a radix of 32 and operates to count a signal SN, and delivers a count SO which is applied to an address terminal of ROM 62. ROM 62 stores amplitude data over one period of the sinusoidal wave at 32 addresses. Specifically, one period is divided into 32 equal portions, and the amplitude at each phase is stored at one of 32 consecutive addresses. Accordingly, when an address of 0, 1, 2, 3, ... 30, 31, 0 is sequentially applied to the address terminal of ROM 62, amplitude data representing one period of a waveform simulating a sinusoidal wave is sequentially read out, for application to the D/A converter 63. Hence a signal SP which is delivered by the D/A converter 63 represents a pseudo-sinusoidal wave as illustrated in FIG. 8. For every 32 waves of the signal SN which is delivered from the PLL circuit 20, a pseudo-sinusoidal wave for one period appears at a signal SP, and thus, the pseudo-sinusoidal wave generator circuit 60 functions also as a frequency divider. Thus the period of the signal SP is 32 times greater than the period of the signal SN.

The low pass filters 11A and 64 function harmonic to eliminate harmonic components contained in the input signal and to extract only a component corresponding to the fundamental wave (or a sinusoidal wave of a frequency which coincides with the natural frequency of the piezoelectric body 2). The purpose of the low pass filter 12A is to compensate for the influence of a phase displacement which occurs in the low pass filter 11A. It is to be noted that the low pass filters 11A, 12A and 64 have a cut-off frequency which is slightly higher than the natural frequency or resonance frequency of the piezoelectric body 2. The resonance frequency of the piezoelectric body 2 undergoes a small change with a temperature change or the like, but is not subject to any significant change, and accordingly, the cut-off frequency of the low pass filters 11A, 12A and 64 is fixed.

Referring to FIG. 2, the PLL circuit 20 comprises a phase comparator 201, a loop filter 202 and VCO (voltage controlled oscillator) 203. The phase comparator 201 includes a pair of input terminals, and delivers a pulse signal having a pulse width which depends on a phase difference between pulse signals applied to its input terminals. The loop filter 202 delivers a signal having an analog voltage which depends on the pulse width of the signal which is output from the phase comparator 201. This signal is fed to VCO 203, which then delivers a triangular wave signal having a frequency which depends on its input voltage. The PLL circuit 20 operates in a manner such that the frequency of the triangular wave signal which is delivered therefrom is automatically adjusted so that the phase difference between the pulse signals applied to the pair of input terminals thereof becomes equal to zero.

Also referring to FIG. 2, the 90° phase shifter 40 comprises a phase comparator 401, a loop filter 42, VCO 43, a frequency divider 44 and a pair of flipflops 45, 46. The phase comparator 401, the loop filter 42, VCO 43 and the frequency divider 44 constitute together a frequency multiplier circuit. In the similar manner as occurred in the PLL circuit 20, the phase comparator 401 operates to deliver a pulse signal having a pulse width which depends on a phase difference between the pulse signals applied to its pair of input terminals. The loop filter 42 delivers a signal of an analog voltage which corresponds to the pulse width of the signal which is output from the phase comparator 401, and this signal is fed to VCO 43, which then operates to deliver a triangular wave signal having a frequency which depends on the input voltage. The output signal from VCO 43 is frequency divided by ¼ by the frequency divider 44 and is fed back to one of the input terminals of the phase comparator 401. Accordingly, in this frequency multiplier circuit, the phase difference between the pulse signals applied to the pair of input terminals of the phase comparator 401 will be equal to zero when VCO 43 delivers a signal having a frequency which is four times the frequency f of the signal which is input to the 90° phase shifter 40, whereupon the phase shifter 40 is locked. In this manner, the output signal from VCO 43 has a frequency which is equal to 4 f.

The output signal from VCO 43 is applied to the flipflops 45 and 46 as a clock pulse. There is obtained a signal SE at the output terminal (Q) of the flipflop 46 which is lagging with respect to the output signal S43 from VCO 43 by one period thereof and which has a period that is four times the period of the signal SD. In other words, the output signal SE from the 90° phase shifter 40 has the same frequency as the input signal SD, and is phase lagging with respect to thereto by 90°. The amount of the phase shift which occurs in the 90° phase shifter 40 is maintained at 90°, regardless of any fluctuation in the frequency of the input signal SD, inasmuch as the phase shift corresponds to one period, as considered in terms of four times the frequency of the input signal SD.

Returning to FIG. 1a, the signal occurring at the feedback electrodes 4a, 4b has a phase difference of 90° with respect to the signal applied to the exciting electrodes 5a, 5b when the cylindrical piezoelectric body 2 is oscillating at the resonance frequency, but such phase difference changes in response to a deviation of the signal frequency from the resonance frequency. It will be seen that the signal SE which is formed from the signal applied to the exciting electrodes 5a, 5b by lagging it by 90° in the phase shifter 40 is applied to one of the input terminals of the PLL circuit 20, while the signal SF which is generated from the signal occurring at the feedback electrodes 4a, 4b is applied to the other input terminal of the PLL circuit 20. Accordingly, when the cylindrical piezoelectric body 2 is oscillating at its resonance frequency, the PLL circuit 20 is locked and maintains a constant oscillation frequency. However, when the oscillation frequency deviates from the resonance frequency as caused by a temperature change, there is a phase displacement between the two input signals to the PLL circuit 20, and the PLL circuit 20 adjusts the oscillation frequency so as to eliminate such phase displacement. In this manner, the cylindrical piezoelectric body 2 is always driven for oscillation at its resonance frequency.

It will be noted that each of the low pass filters 11A, 12A and 64 represents a time constant circuit, producing a phase difference between its input and output, which changes in accordance with a signal frequency. However, it will be seen that a phase displacement caused by the low pass filter 64 has influences upon the signals SE and SF in common. Since the influence of the phase displacement caused by the low pass filter 11A upon signal SF substantially matches the influence of the phase displacement signal caused by the low pass filter 12A upon signal SE, these influences are cancelled by each other as far as the PLL circuit 20 is concerned. Hence, any phase displacement caused by the low pass filters 11A, 12A and 64 has no substantial influence upon the PLL circuit 20, and accordingly, the cylindrical piezoelectric body 2 is maintained at its resonance in the presence of any fluctuation in the oscillation frequency.

A circuit which is used to determine the angular rate of rotation will now be described. A signal which appears at the detecting electrodes 6a, 6b of the piezoelectric body 2 passes through a low pass filter 13A and is then applied to an inverter 13B with a Schmidt trigger, whereby it is converted into a binary signal SGa. The signal SGa is applied to one input terminal of a phase comparator 51. A signal which appears at the detecting electrodes 7a, 7b is passed through a low pass filter 14A and is then applied to an inverter 14B with a Schmidt trigger, whereby it is converted into a binary signal SGb. The signal SGb is applied to the other input terminal of the phase comparator 51.

FIGS. 5a–5c and 6 show a signal (voltage) SA applied to the exciting electrodes 5a, 5b, a signal SB which appears at the feedback electrodes 4a, 4b, a signal SC which appears at the detecting electrodes 6a, 6b/7a, 7b, and binary signals SGa/SGb and SH. When an angular rate in the clockwise direction ω is applied the cylindrical piezoelectric body 2 as shown in FIG. 4, a voltage as indicated by a sinusoidal wave shown in solid line in FIG. 5a appears at the second set of detecting electrodes 7a, 7b while a voltage as indicated by a sinusoidal wave shown in solid line in FIG. 5b appears at the first set of detecting electrodes 6a, 6b. These Figures also indicate a voltage component in direction D2 (shown in thin single dot phantom lines) and a voltage component in direction D4 (shown in double dot phantom lines). As shown in FIGS. 1 and 4, since the detecting electrodes 6a, 6b/7a, 7b are located so as to be offset from the nodal points Np1a, Np1b/Np2a, Np2b of the excited oscillation (D2) by an angle θ toward the antinodes (5a, 5b), a significant amount of voltage component in the direction D2 appears at the detecting electrodes 6a, 6b/7a, 7b which is combined with a voltage component in the direction D4 which is attributable to the angular rate to form a resultant wave, which appears actually at the detecting electrodes 6a, 6b/7a, 7b (see solid lines in FIGS. 5a and 5b).

When an angular rate in the clockwise direction ω is applied, the resulting voltage component in direction D4 (indicated in double dot phantom lines) for the detecting electrodes 6a, 6b will be substantially 180° lagging (assuming that one period of oscillation covers 360°) with respect to the voltage component for the detecting electrodes 7a, 7b, but the detecting electrodes 7a, 7b are located forward while the detecting electrodes 6a, 6b are located rearward with respect to a twist of the oscillation from the direction D2 to direction D4 (or phase shift) as a result of application of an angular rate in the clockwise direction ω, so that D4 voltage component at the detecting electrodes 7a, 7b will lead in phase while D4 voltage component at the detecting electrodes 6a, 6b will lag in phase in response to the angular rate in the clockwise direction ω. As a consequence, there will be produced a phase difference (ΔT) between the voltages appearing at the detecting electrodes 7a, 7b (shown in solid line in FIG. 5a) and the voltage appearing at the detecting electrodes 6a, 6b (shown in solid line in FIG. 5b) which is of a magnitude equal to twice a phase difference between each of these voltages and an associated exciting voltage (D2) which occurs in response to the angular rate ω. The phase comparator 51 develops a signal SH which assumes a high level H only during the interval of the phase difference (ΔT).

An output signal SH from the phase comparator 51 is applied to one input terminal of NAND gate 52, the other input terminal of which receives an output signal SI from a multiplier circuit 50. An output signal form a frequency divider 56 is applied to the input of the multiplier circuit 50. The frequency divider 56 receives an output signal SN from the PLL circuit 20 at its input terminal. The signal SN is applied to a counter 55 as a clock pulse. The counter 55 delivers a carry signal SJ, which is applied to a clear terminal of a counter 53 and to a clock terminal of a latch 54. An output signal SK from the NAND gate 12 is applied to the counter 53 as a clock pulse. A count SL in the counter 53 is applied to the input terminal of the latch 54.

In the present embodiment, the pseudo-sinusoidal wave generator circuit 60 delivers an output signal having a period which is 32 times greater than that of an input signal thereto. The frequency divider 56 delivers an output signal having a period which is 31 times greater than that of an input signal thereto. The multiplier circuit 50 delivers an output signal having a frequency which is 1024 times greater than that of an input signal thereto. The counter 55 has a radix of 992. Accordingly, denoting the period and the frequency of the signal SA by T and f, respectively, the periods and the frequencies of the respective signals are as indicated below.

| signal | period | frequency |
| --- | --- | --- |
| SA, SB, SC: | T, | f |
| SN: | T/32, | 32f |
| SJ: | 31T, | f/31 |
| SI: | 31T/(32 × 1024), | (32 × 1024)f/31 |

An example of the timing of the signals SA, SB, SC, SD, SE, SF, SG, and SH is shown in FIG. 6. A phase difference between the signals SA and SB is maintained at 90° through the control by the PLL circuit 20. A phase difference between the signal SB (SF) and SC (SG) varies in proportion to an angular rate of rotation which is applied to the cylindrical piezoelectric body 2. Denoting the period of an exciting voltage SA (D2) by T and the pulse width of a signal SH delivered from the phase comparator 51 by ΔT, ΔT/T varies in proportion to a phase difference between the signal SF and the signal SG or in proportion to the angular rate. Accordingly, information indicative of the angular rate can be obtained by determining ΔT/T.

As shown in FIG. 2, the multiplier circuit 50 comprises a phase comparator 501, a loop filter 502, a VCO 503 and a frequency divider 504. The frequency divider 504 in the multiplier circuit 50 has a frequency division ratio of 1024. Accordingly, there is obtained at the output of the multiplier circuit 50 a signal having a frequency which is 1024 times greater than that of an input signal thereto.

As shown in FIGS. 6 and 7, the signal SH assumes either a high level H or a low level L during an interval of ΔT every period T/2. During the interval when the signal SH assumes a high level H or a low level L, a pulse of the signal SI appears in the signal SK. The number of pulses in the signal SK, or an interval equivalent to ΔT which corresponds to an angular rate is counted by the counter 53. A signal SJ which clears the counter 53 has a period of 31T, and accordingly the counter 53 calculates an accumulated time interval of ΔT×31 during the interval of 31T. The accumulated value is stored in the latch 54 and is delivered as a signal SM. The signal SM is data representing an angular rate, indicating the absolute value thereof.

A direction detection circuit 57 shown in FIG. 1b includes a flipflop which is set as the signal SGa rises from a low level L to a high level H while the signal SGb remains at its low level L to change its output signal SN from its low level L to its high level H, indicating that the angular rate is acting in the clockwise direction, and which is reset as the signal SGa rises from its low level L to its high level H while the signal SGb remains at its high level H to change the output signal SN to its low level L, indicating that the angular rate is acting in counter-clockwise direction. Thus, the output signal SN represents the direction in which the angular rate is acting, whether it is acting in the clockwise or counter-clockwise direction.

In the circuit shown in the FIG. 1b, the frequency division ratio of the pseudo-sinusoidal wave generator circuit 60 is chosen to be different from the frequency division ratio of the frequency divider 56 for a particular reason. Specifically, by choosing the frequency of the signal SI, which provides pulses to be counted by the counter 53, not to be an integral multiple of the frequency of oscillation (1/T) of the cylindrical piezoelectric body 2, the accuracy of determination can be enhanced without choosing an appreciably high frequency for the signal SI.

In the circuit shown in FIG. 1b, if the frequency division ratio of the frequency divider 56 is changed to 1/32, the frequency of the signal SI will be equal to 1024 f. Accordingly, the resolution with which the phase difference ($\Delta T/T$) can be determined will be equal to 1/1024, preventing a minute change in the angular rate from being determined. To enhance the resolution, the frequency of the signal SI may be increased. However, at this end, a special circuit arrangement must be used which operates a determining circuit such as the counter 53 at a high rate, resulting in a very expensive arrangement.

In the actual circuit shown in FIG. 1b, the frequency of the signal SI is equal to (32×1024)f/31. Accordingly, the number of pulses in the signal SI which occurs during a time interval T will be equal to 32×1024/31. Normally in a digital circuit, a number of pulses which is below the decimal point is either rounded off or rounded up, causing an error. However, because the pseudo-sinusoidal wave generator circuit 60 and the frequency divider 56 have different frequency division ratios in the circuit arrangement of FIG. 1b, a phase at which a pulse in the signal SI occurs during the time interval T will be slightly shifting from time to time, and accordingly, a fraction below the decimal point of the number of the pulses in the signal SI which are counted during the interval T may be rounded off during a certain period, but a similar fraction may be rounded up during another period. As a consequence, by averaging the number of the pulses which are counted over a plurality of periods, the magnitude of the error can be reduced.

In actuality, the period of the signal SJ which determines the counting period of the counter 53 is equal to 31 T. Accordingly, the determination of a time interval $\Delta T$ is repeated 31 times, and an accumulated value of $\Delta T$'s during the time interval of 31 T, or a value which is obtained by smoothing errors resulting from rounding off and up is counted by the counter 53 and is then stored in the latch 54. Thus, since the number of the pulses in the signal SI during the interval 31 T is equal to 32×1024, the resolution that can be achieved in determining the phase difference ($\Delta T/T$) is equal to 1/(32×1024). This means that as compared with an arrangement in which a same frequency division ratio is chosen for both pseudo-sinusoidal wave generator circuit 60 and the frequency divider 56, the resolution is improved by a factor of 32. This allows the angular rate to be determined with a high accuracy even when the frequency of the signal SJ is low.

By way of example, when the cylindrical piezoelectric body 2 has a frequency of oscillation which is equal to 8 KHz, in order to detect a phase difference with a resolution of 0.02°, it is necessary that clock pulses be counted at 144 MHz if usual circuit is employed, presenting a difficulty in the circuit arrangement. However, with the present embodiment, the frequency of the clock pulse (SI) can be reduced to about 4.8 MHz, thus greatly simplifying the circuit arrangement.

In the above description of the first embodiment, the 90° phase shift circuit 40 is employed to apply the signal SA which is shifted by 90° to one input of the PLL circuit 20, but 90° phase shift circuit 40 may be disposed at a different position so that the signal SB which is shifted by 90° may be applied to the other input of the PLL circuit 20.

In the first embodiment described above, a phase difference $\Delta T$ between voltages developed by the first electrode 6a and the second electrode 7a which are disposed toward the first and the second nodal point Np1a and Np2a which are located symmetrically with respect to the electrode 5a (antinode) which is used to excite the oscillator 2 is detected as a value indicating an angular rate, thus achieving a high sensitivity with respect to the angular rate.

In addition, the first electrode 6a and the second electrode 7a are disposed at locations which are offset from the first and the second nodal point Np1a, Np2a by a given angle $\theta$ toward the antinode 5a, and therefore it will be seen that a voltage which is developed at these electrodes contain a higher proportion of oscillation component D2 (SA) caused by the excitation from the electrode 5a than in the prior art. This is effective as a bias component to raise the levels of the voltages detected by the electrodes 6a and 7a. These detected voltages are applied to the low pass filters 13A and 14A each including a time constant circuit, but because the voltage level is high, they can be reflected in the detection of the phase difference $\Delta T$ between voltages at 13B and 14B while avoiding their disappearance in the filters 13A and 14A if the angular rate component (D4) is low. This allows the accuracy to be enhanced when detecting an angular rate in a region of low values thereof.

It is to be noted that as the offset angle $\theta$ is increased, the sensitivity of detecting an excited oscillation component (D2 voltage component shown in FIGS. 5a, 5b and 5c) rises while the sensitivity of detecting an angular rate responsive component (D4 responsive component shown in FIG. 5) becomes degraded, as shown in FIG. 9. It is to be noted that FIG. 9 is a graphical illustration based on a calculation, and as far as the angular rate responsive component is concerned, the ordinate of FIG. 9 represents a normalized level, namely, the ratio of a voltage (peak value) developed at the electrode 7a when it is offset by $\theta$ to a voltage (peak value) developed at the electrode 7a when it is disposed at the nodal point Np2a. As far as the excited oscillation component is concerned, the ordinate represents an normalized value of a voltage developed at the electrode 7a when it is offset by $\theta$, the normalization choosing a voltage developed at the electrode 7a when it is located at 5a as 1. It will be noted that within a range of $\theta$ less than 3°, a reduction in the sensitivity of the angular rate responsive component is very slight while an increase in the sensitivity of the excited oscillation component is relatively high. For example, at $\theta=3°$, an excited oscillation component which is substantially equal to 0.1 (10%) of the exciting voltage SA appears at the electrode 7a, and largely biases the angular rate responsive component, whereby a resultant wave comprising the angular rate responsive component and the excited oscillation component passes through the low pass filter 14A to be applied to the inverter 14B with a Schmidt trigger. Accordingly, an output signal SGb from the inverter 14B comprises a pulse including a time delay which is caused by the angular rate. The same is true with the electrode 6a. Thus, the accuracy of detecting an angular rate in a region of low values thereof is improved.

Second Embodiment

Joining FIGS. 10a and 10b reveals the overall arrangement of an angular rate detector according to a second embodiment of the invention. A sensor element 10 shown in FIG. 10a is generally similar in construction to the first embodiment. However, while in the first embodiment, the detecting electrodes 6a, 6b/7b, 7a are located so as to be offset by θ toward the second diametrical direction D2 from points of intersection of the third diametrical direction D3 and the fourth diametrical direction D4 which is orthogonal thereto with the cylindrical piezoelectric body 2, in the arrangement of the sensor element 10 shown in FIG. 10a, detecting electrodes 6a, 6b/7a, 7b are located at points of intersections of the third diametrical direction D3 and the fourth diametrical direction D4 which is orthogonal thereto with the cylindrical piezoelectric body 2. Thus, they are located at a nodal points Np1a, Np1b/Np2a, Np2b (FIG. 4) of the excited oscillation D2.

Referring to FIGS. 10a and 10b, the voltage developed at the feedback electrodes 4a, 4b of the cylindrical piezoelectric body 2 is amplified by an amplifier circuit 11 (FIG. 10a) and then applied to a buffer amplifier and waveform conversion circuit 21 (FIG. 10b) as a feedback signal FB1. An analog signal FB2 is delivered from the circuit 21, and a binary signal FB3 is delivered from the waveform circuit 21. The signal FB2 is applied to a first input terminal of an automatic gain control circuit 25, and the signal FB3 is applied to a second input terminal of the automatic gain control circuit 25 and to one input terminal of a 90° phase comparison circuit 27.

The automatic gain control circuit 25 delivers an output voltage (FB4) which is substantially proportional to an input voltage FB2 as long as the input voltage FB2 is less than a preset value, but delivers a constant voltage (FB4) of a minimal value close to the electrical ground in a region of the input voltage above the preset value. Thus, the signal FB4 which is obtained at the output of the control circuit 25 is substantially equal to the input signal FB2, but a signal having an excessive level (above the preset value) is cut off and cannot appear in the signal FB4.

The output signal FB4 delivered by the automatic gain control circuit 25 is applied to a first input terminal of a bandpass filter 29 and to an input terminal of an oscillation starter circuit 28. A signal CON1 delivered by the oscillation starter circuit 28 is applied to a second input terminal of the bandpass filter 29. A signal CON2 applied to a third terminal of the bandpass filter 29 is delivered by an integrating circuit 30. The construction of the integrating circuit 30 is shown in FIG. 11a.

The bandpass filter 29 delivers an output signal which passes through a 90° phase delay circuit 26 to be delivered as a drive signal DV1, which is in turn applied to the exciting electrodes 5a, 5b of the cylindrical piezoelectric body 2. The construction of the 90° phase delay circuit 26 is shown in FIG. 11b. The drive signal DV1 is also converted into a binary signal by a waveform conversion circuit 22 to be input to the 90° phase comparison circuit 27. The comparison circuit 27 essentially comprises an exclusive OR gate, and delivers a pulse signal having a pulse width which depends on a phase difference between the feedback signal FB3 delivered from the waveform conversion circuit 21, including a buffer amplifier and comparator, and a signal SVD delivered by the waveform conversion circuit 22. This pulse signal is applied to the integrating circuit 30.

The level of the signal CON2 delivered by the integrating circuit 30 generates an output voltage CON2 having a V-shaped response with respect to the phase difference between the feedback signal FB3 delivered by the buffer amplifier and waveform convention circuit 21 and the signal SVD delivered by the wave form conversion circuit 22, assuming a maximum value Vmax at a phase difference of 0°, a minimum value Vmin at a phase difference of −180° and again assuming a maximum Vmax at a phase difference of −360°. The output voltage CON2 is applied to the third input terminal of the bandpass filter 29.

As shown in FIG. 12a, the bandpass filter 29 includes a variable capacitance diode (varicap) 29a, which is used in reversely biased condition. Accordingly, by changing a bias voltage applied to the variable capacitance diode 29a, the phase response of the diode 29a can be shifted in the direction of abscissa or the axis representing the input frequency, along which the center frequency fo can be shifted. The phase response is such that a phase difference between the input and the output is equal to −180° at the center frequency fo; a phase difference between the input and the output gradually increases toward −360° as the input frequency increases in a given region centered about the center frequency fo; the phase difference remains substantially zero when the input frequency is in a region under the given region; and the phase difference remains substantially −360° when the input frequency is in a region over the given region. A bias voltage applied to the diode 29a varies in accordance with the levels of signals FB4, CON1 and CON2 applied to the three input terminals of the bandpass filter 29.

In the present embodiment, the voltage developed at the feedback electrodes 4a, 4b of the piezoelectric body 2 is amplified, and is then phase shifted. By applying the phase shifted signal to the exciting electrodes 5a, 5b, a closed loop circuit is formed while encouraging the occurrence of an oscillation by applying a positive feedback. In actuality, referring to FIGS. 10a and 10b, the voltage developed at the feedback electrodes 4a, 4b passes through the amplifier circuit 11 to provide the signal FB1, which is then passed through the buffer amplifier and waveform conversion circuit 21 to provide the signal FB2, which is then passed through the automatic gain control circuit 25 to provide the signal FB4, which is in turn passed through the bandpass filter 29, the 90° phase delay circuit 26 and a drive current detector circuit 12 before it is applied to the exciting electrodes 5a, 5b, thus forming a closed loop circuit.

In order for an oscillation to occur within this closed loop circuit, two requirements must be satisfied. One of the requirements is that the loop gain of the closed loop circuit be equal to or greater than 1, and another requirement is that a phase change during on excursion through the closed loop circuit be an integral multiple of 360°. For the circuit shown in FIGS. 10a and 10b, when the oscillator 10 is oscillating at its natural frequency, a phase difference between the exciting electrodes 5a, 5b and the feedback electrodes 4a, 4b will be 90°. A phase difference between the input and the output of the 90° phase delay circuit 26 will be about 90° for frequencies near the resonant frequency of the oscillator 10. In addition, a phase difference between the input (FB4) and the output of the bandpass filter 29 will be 180° under a given condition. Accordingly, summing a phase shift between the exciting electrodes 5a, 5b and the feedback electrodes 4a, 4b, a phase shift through the 90° phase delay circuit 26 and a phase shift through the bandpass filter 29, a phase change which occurs during one excursion through the closed loop circuit can be made equal to 360°. Since an amplifier circuit is included in the loop, the loop gain of the oscillator 10 with respect to the resonant frequency can be made to be equal to or greater than 1. Accordingly, the closed loop circuit of the circuit arrangement shown in FIGS. 10a and 10b can be made to oscillate at the resonant frequency of the oscillator 10.

The gain (the feedback voltage divided by the exciting voltage) of the oscillator 10 will be at its maximum while the phase difference between the exciting voltage and the feedback voltage is nearly 90° at the natural frequency fo.

However, even if an oscillator 10 is designed to provide natural frequency fo , the resonant frequency of the resulting oscillator 10 will be slightly offset from fo due to variations in size during the manufacturing process or under the influence of a change in size which is caused by a temperature change.

When using a sensor element 10 having an offset response, there will be produced a phase difference between DV1 and FB3 which is largely displaced from 90° with respect to the frequency fo , and hence if the sum of a phase shift in the 90° phase delay circuit 26 and a phase shift in the bandpass filter 29 is not equal to 360°, the oscillation will not occur.

The 90° phase delay circuit 26 exhibits the phase response as described, and accordingly, it produces an output signal which has a phase shift of 90° with respect to the input signal at the frequency fo , but has a different amount of phase shift for other frequencies. Accordingly, if the oscillator 10 has a natural frequency which is different from fo, the 90° phase delay circuit 26 cannot afford a phase shift of 90°, which is required to provide a one excursion phase difference through the closed loop circuit of 360°, for this oscillator 10, which therefore may fail to oscillate.

However, in the present embodiment, a phase change experienced during one excursion through the closed loop circuit is controlled to be 360°, principally by the action of the bandpass filter 29 for frequencies in a relatively wide range which is centered about a designed value fo for the natural frequency of the oscillator 10. In this manner, the oscillation of the oscillator 10 is assured if the natural frequency deviates from a designed value or reference value fo due to variations in the response of the oscillator 10 from product to product or due to a temperature change.

The construction of the bandpass filter 29 is shown in FIG. 12a. The bandpass filter 29 exhibits a gain response as shown in FIG. 15a and a phase response as shown in FIG. 15b. The resonant frequency of the filter varies in accordance with the bias voltage Vb applied to the variable capacitance diode 29a.

Referring to FIG. 15a, when the bias voltage Vb is "median", for example, the resonant frequency or the center frequency will be fo1 which may be assumed to be a reference frequency fo1 and it is seen that the gain will be at its maximum at the frequency fo1 while the amount of the phase shift will be equal to 180° (see the phase response of FIG. 15b) at the frequency fo1. For a frequency fo2 lower than the frequency fo1, the amount of phase shift will be less than 180° while for a frequency fo3 higher than the frequency fo1, the amount of phase shift will be greater than 180°.

When the bias voltage Vb is "low", the resonant frequency will be fo2, and the gain will be at its maximum at the frequency fo2 (see the gain response of FIG. 15a), while the amount of phase shift will be 180° at frequency fo2 (see the phase response of FIG. 15b). For a frequency lower than the frequency fo2, the amount of phase shift will be less than 180° while for a frequency fo1 higher the frequency fo2, the amount of phase shift will be greater than 180°.

When the bias voltage Vb is "high", the resonant frequency will be fo3, and the gain will be at its maximum at the frequency fo3 (see the gain response of FIG. 15a), while the amount of the phase shift will be 180° at frequency fo3 (see the phase response of FIG. 15b). For a frequency fo1 lower than the frequency fo3, the amount of phase shift will be less than 180° while for a frequency higher than the frequency fo3, the amount of phase shift will be greater than 180°.

Thus when the magnitude of the bias voltage Vb is increased, the signal passing through the bandpass filter 29 will experience a greater phase shift. Conversely, when the magnitude of the bias voltage Vb is reduced, the signal passing through the bandpass filter 29 experiences a less phase shift. The bias voltage Vb is determined by voltages FB4, CON1, and CON2 applied to the three input terminals of the bandpass filter 29. It is to be noted that these voltages include dc components (mostly in CON1 and CON2) and ac component (mostly in FB4), and the both components have influence upon the bias voltage Vb. In the present embodiment, the amplitude of the ac component is chosen to be sufficiently small with respect to the level of the dc component, thereby preventing the response of the bandpass filter 29 from experiencing a large variation under the influence of the ac component.

By way of example, when the oscillator 10 is oscillating at its natural frequency, a phase difference between the signals applied to the two input terminals of the 90° phase comparison circuit 27 shown in FIG. 10b will be 90°, and accordingly, the level of the signal CON2 delivered from the integrating circuit 30 will be at a reference level Vc which is an intermediate of maximum Vmax and minimum Vmin, and the resonant frequency of the bandpass filter 29 will be at fO1 shown in FIGS. 15a and 15b, for example. When the resonant frequency fo1 of the oscillator 10 and the resonant frequency fo1 of the bandpass filter 29 coincide, the phase shift through the bandpass filter 29 at this frequency will be 180°, and the shift through the 90° phase delay circuit 26 will also be 90°, so that the amount of phase shift during one excursion through the closed loop circuit will be 360°, thus allowing the closed loop circuit to oscillate.

At the resonant frequency of the sensor element 10, the magnitude of a phase shift between the exciting electrodes 5a, 5b and the feedback electrodes 4a, 4b will be equal to 90°. Accordingly, if the magnitude of a phase shift which occurs elsewhere in the closed loop other than the sensor element 10 is equal to 270°, the oscillation occurs at the frequency f if the resonant frequency f of the sensor element 10 is offset from its reference value fo. The magnitude of a phase shift through the bandpass filter 29 varies depending on the frequency, as does the magnitude of a phase shift through the 90° phase delay circuit 26. If a sum $\phi A+\phi B$ of a phase shift $\phi A$ in the bandpass filter 29 and a phase shift $\phi B$ in the 90° phase delay circuit 26 at the frequency f is less than 270°, a phase difference between FB3 and DV1 will be less than 270°, and a signal CON2 which corresponds to such phase difference will have a level which is below Vc. As a consequence, the resonant frequency of the bandpass filter 29 will be reduced below fo1, and the phase shift $\phi A$ of the bandpass filter 29 will increase. The output voltage CON2 from the integrating circuit 30 increases, whereby the sum of phase shifts $\phi A+\phi B$ approaches 270° and the output voltage from the integrating circuit 30 will converge to Vc.

Conversely, if the sum of a phase shift $\phi A$ in the bandpass filter 29 and a phase shift $\phi B$ in the 90° phase delay circuit 26 at the frequency f is greater than 270°, a phase difference between the signals FB3 and DV1 will be greater than 270°. The signal CON2 which corresponds to such phase difference will have a level which will be above Vc. As a consequence, the resonant frequency of the bandpass filter 29 will rise above fo1, reducing the amount of the phase shift $\phi A$ of the bandpass filter 29. The output voltage CON2 from the integrating circuit 30 is reduced, the sum of phase shifts $\phi A+\phi B$ approaches 270°, and the output voltage from the integrating circuit 30 converges to Vc.

The oscillation starter circuit 28 is connected to the bandpass filter 29. The oscillation starter circuit 28 is constructed as shown in FIG. 12b so that it increases the loop gain of the closed loop circuit temporarily upon turning on the power. When the loop gain is increased, the range of the frequencies which satisfy the condition for oscillation is broadened, thus allowing, if the oscillator has started an unstable oscillation at a frequency which is greatly offset from the resonant frequency thereof immediately after the power is turned on, the oscillation frequency to be brought close to the resonant frequency so as to stabilize the oscillation.

Referring to FIG. 12b, the oscillation starter circuit 28 includes an analog switch 28a, the input side of which is connected to the signal FB4, and signal CON1 appearing at the output of the switch is input to the bandpass filter 29. When the power supply (Vcc) is turned on, a current which charges a capacitor C1 passes through a series circuit of capacitor C1 and resistor R1, and a voltage drop Vcr across the resistor R1 changes from the ground level to a high level, thus switching the analog switch 28a on. As the capacitor C1 continues to be charged and its voltage approaches Vcc, the voltage drop Vcr across the resistor R1 is reduced, turning the analog switch 28a off. Thus, a time constant circuit comprising capacitor C1 and resistor R1 represents a kind of timer acting to increase the voltage Vcr to turn the switch 28a on for a given time interval upon turn on of the power. By applying a given reset signal to an input terminal 28b of the oscillation starter circuit 28, a discharge circuit for capacitor C1 is completed. When the reset signal is removed, the charging of the capacitor C1 is commenced in a similar manner as immediately after the turn-on of the power, allowing the analog switch 28a to be turned on temporarily again, without again turning the power on.

Referring to FIG. 12a, when the analog switch 28a is off, a current corresponding to the signal FB4 alone passes through resistor RA to be supplied to the filter 29. In other words, a first signal corresponding to the voltage developed at the feedback electrode is applied to the filter 29. When the analog signal 28a is on, the current corresponding to the signal FB4 passes through a parallel circuit of resistor RA and RB (see FIGS. 12a and 12b). In other words, a sum of the first signal and a second signal corresponding to the voltage developed at the feedback electrode is applied to the filter 29. Accordingly, when the analog switch 28a is on, the positive feedback loop in which the 8 KHz bandpass filter 29 is included exhibits a higher gain.

Referring to FIG. 10a again, an amplifier 12 connected to the exciting electrodes 5a, 5b amplifies a drive voltage DV1 for application to the waveform shaping circuit 22, and also functions as a low pass filter to cut off high frequencies (harmonics). The 90° phase delay circuit 26 (FIG. 11b) is a piezo-driver, and includes a drive amplifier in its output stage which has a low output impedance. Accordingly, as viewed from the cylindrical piezoelectric body 2, the vibrator system (D2) comprising the exciting electrodes 5a, 5b and their connected 90° phase delay circuit 26 and the amplifier 12 exhibits a low impedance.

Connected to the feedback electrodes 4a, 4b is an integrating circuit 11, which also functions as a low pass filter to cut off high frequencies (harmonics). Since the feedback electrodes 4a, 4b are connected to the electrical ground through an imaginary short-circuit at the input end of an operational amplifier contained in the integrating circuit 11, as viewed from the cylindrical piezoelectric body 2, the feedback system (D1) comprising the feedback electrodes 4a, 4b and their connected integrating circuit 11 also exhibits a low impedance. Thus, an impedance, as viewed from the cylindrical piezoelectric body 2, of a feedback oscillation drive system which excites the cylindrical piezoelectric body 2 for oscillation at its natural frequency is low, and the function of the band pass filter 29 to adjust the excitation frequency allows the cylindrical piezoelectric body 2 to be efficiently excited for oscillation in directions D1 and D2 at its natural frequency (7,566 Hz).

The amplifiers 13 and 14 are identical in construction and response, and also function as a low pass filter to cut off high frequencies (harmonics). The detecting electrodes 6a, 6b/7a, 7b are connected to the electrical ground through the resistance Re of the respective amplifiers 13 and 14, and accordingly, the impedance as viewed from the cylindrical piezoelectric body 2, of an assembly comprising the detecting electrodes 6a, 6b/7a, 7b and their connected amplifier 13/14 is equivalent in effect to the resistance of the resistor Re (FIG. 10a). A relationship between the resonant frequency of such detecting system (in directions D3, D4) and the resistance of the resistor Re is graphically shown in FIG. 16.

In FIG. 16, the resonant frequency of 7,566 Hz is the natural frequency of the cylindrical piezoelectric body 2 in the present example, and the resonant frequency of the detecting system (in direction D3, D4) substantially matches the natural frequency of the cylindrical piezoelectric body 2 for a resistance of the resistor Re which is substantially equal to or less than 100Ω. However, as the resistance of the resistor Re increases above 100Ω, the resonant frequency of the detecting system (in directions D3, D4) increases gradually, whereby a difference between it and the natural frequency (or a difference of it with respect to the resonant frequency in directions D1, D2) increases. At a resistance of the resistor Re which is equal to 1 MΩ, the difference will be $\Delta f \approx 17$ Hz.

FIG. 17 graphically shows a relationship between a difference in the resonant frequencies and the magnitude of a phase displacement of the detection voltage when the angular rate ω is applied. In FIG. 17, the abscissa represents a difference in the resonant frequencies while the ordinate represents the magnitude of a phase displacement of the detection voltage as the angular rate ω is applied. A curve in solid line corresponds to an angular rate ω of ±90°/sec, and a curve in dotted lines corresponds to an angular rate ω of ±20°/sec. At a difference between the resonant frequencies which is close to 0, it is impossible to detect a phase displacement of the detection voltage, but a detection of a phase displacement becomes possible at a difference in the resonant frequencies which is equal to or above about 10 Hz. In such region, the less the difference in the resonant frequencies, the higher the resolution of detecting the phase displacement. In other words, the accuracy of the detecting the angular rate ω becomes higher, and the resolution in detecting the angular rate ω in a region of low values thereof is higher.

Accordingly in the present embodiment, the resistor Re of the amplifiers 13 and 14 is chosen to exhibit a resistance of 1 MΩ, and the resonant frequency of the detection system (in direction D3, D4) is chosen to be by $\Delta f \approx 17$ Hz higher than the resonant or natural frequency of the vibrator system (in directions D1, D2).

Returning to FIGS. 10a and 10b, a signal which appears at the first detecting electrodes 6a, 6b of the sensor element 10 is detected by the amplifier circuit 13, and is then converted into a binary signal or square wave by the waveform conversion circuit 23 to be delivered as a signal SS1. A signal which appears at the second detecting electrodes 7a, 7b is detected by the amplifier circuit 14 and is converted into a binary signal or square wave by the waveform conversion circuit 24 to be delivered as a signal SS2. These binary signals SS1 and SS2 are applied to a phase comparison circuit 41. The phase comparison circuit 41 delivers a high level H when only one of the signals, SS1, assumes a high level H, delivers a low level L when only the signal SS2 assumes a high level H, and delivers a reference or intermediate potential M when the both signals are either at their high level H or at their low level L, to a smoothing circuit 31 in each instance.

FIG. 14 graphically shows the voltages S11, S12 developed at the detecting electrodes 6a, 6b/7a, 7b as well as other signals which are generated on the basis of these voltages. In the absence of an angular rate ω applied, there is substantially no oscillation component in directions D3 and D4, and accordingly, only the oscillation component in the excited direction alone appears in the detected voltages S11 and S12. However, when an angular rate ω in a certain direction is applied to the cylindrical piezoelectric body 2, the detected voltages S11 and S12 assume levels which corresponds to the angular rate ω and containing a phase displacement with respect to the directions D1 and D2 (DV1, FB2) in accordance with the angular rate ω. In addition, in response to an increase/decrease of the angular rate ω, one of the detected voltages S11 and S12 produces a positive phase displacement while the other produces a negative phase displacement. Such relationship is reversed when the direction of the angular rate ω is reversed. As a consequence an output signal SH from the phase comparison circuit 41 obtains a pulse width having an H level which is twice the magnitude of a phase displacement which occurs for either one of the detected voltages in response to the angular rate ω. The width ΔT of the H level represents the angular rate ω.

The smoothing circuit 31 shown in FIG. 10b is a pulse width-to-voltage converter, which produces an analog voltage (Vout) having a level which is proportional to the pulse width of the signal SH. This analog voltage is amplified by the amplifier circuit 32. The level of the output voltage Vout represents the angular rate ω.

Third Embodiment

FIG. 19 shows the appearance of a sensor element 10 according to a third embodiment of the invention, and the sensor element 10 is shown in cross section in FIG. 18. Initially referring to FIG. 19, a cylindrical piezoelectric body 2 has a symmetrical configuration with respect to a center axis, which is perpendicular to the plane of the drawing as viewed in FIG. 18 and which is parallel to the plane of the drawing as viewed in FIG. 19. A total of four weights Qa, Qb, Qc and Qd having a substantially equal mass are fixedly mounted on the cylindrical piezoelectric body 2, each disposed at locations defined by the intersection of a plane containing the centers of the exciting electrodes 5a, 5b and the center axis with the peripheral edge of the piezoelectric body 2 at it top end, and locations defined by the intersection of a plane which is orthogonal to the planes just mentioned with the peripheral edge of the piezoelectric body 2 at its top end, or locations where extensions of the first diametrical direction D1 and the second diametrical direction D2 intersect with the peripheral edge. More specifically, each of the weights Qa, Qb, Qc and Qd, formed by a piece of metal, has a lateral side which is curved along the peripheral surface of the cylindrical piezoelectric body 2, and is secured to the outer periphery of the piezoelectric body 2 at its top end. It will be noted that the upper end of each weight extends toward the axis of the piezoelectric body 2 along the upper end face of the piezoelectric body 2. The weights Qa, Qb are disposed above the extension of the first diametrical direction D1 or above the exciting electrodes 5a, 5b while the weights Qc, Qd are disposed above the extension of the second diametrical direction D2 or above the feedback electrodes 4a, 4b.

It will be noted that a principal oscillation (D2) and a subsidiary oscillation (D1) are offset in phase by 180° from each other, but have a common oscillation frequency f, which is given by the equation (4) given above. However, the presence of the weights Qa, Qb, Qc and Qd increase the mass of oscillation, whereby the resonant frequency f is low. Specifically, a second oscillation, namely, an oscillation in the direction D3 in which the first detection system exhibits a highest sensitivity of detection and in direction D4 in which the second detection system exhibits a highest sensitivity of detection has a resonant frequency, which is substantially equal to the natural frequency of the cylindrical piezoelectric body 2 which would be obtained in the absence of the weights Qa, Qb, Qc and Qd, but the first oscillation, or the principal oscillation (D2) and the subsidiary oscillation (D1) mentioned above, has a frequency which is lower than this natural frequency. In the present embodiment, the mass of the weights Qa, Qb, Qc and Qd are chosen such that the first oscillation exhibits a frequency which is by Δf≈16 Hz (which is the value of Δf illustrated in FIG. 17) lower than the natural frequency.

As in the second embodiment shown in FIG. 10a, the feedback electrodes 4a, 4b are connected to an integrating circuit 11, the exciting electrodes 5a, 5b are connected to an amplifier 12, and the detecting electrodes 6a, 6b/7a, 7b are connected to amplifiers 13/14. These circuit components are similar to those used in the second embodiment, and are connected to an angular rate determining circuit which is the same as shown in FIG. 10b.

When a voltage is applied across the exciting electrodes 5a, 5b and reference potential electrodes 3a, 3b to cause the cylindrical piezoelectric body 2 to oscillate in the first diametrical direction D1 and the second diametrical direction D2 (first oscillation), as shown in dotted lines and double dot phantom lines in FIG. 20, the locations where the respective weights are disposed assume the antinodes of the oscillation. However, because the detecting electrodes 6a, 6b, 7a, 7b are disposed at the nodes of the oscillation, the weights Qa, Qb, Qc and Qd act to reduce the oscillation frequency of the first oscillation while they do not act to reduce the frequency of the second oscillation in the directions D3 and D4 where the detecting electrodes 6a, 6b, 7a, 7b exhibit a highest sensitivity of detection.

As shown in FIG. 17, it is impossible to detect a phase displacement of the detected voltage for a difference in the resonant frequencies which is near 0. The detection of a phase displacement is possible for a difference in the resonant frequencies which is equal to or greater than about 10 Hz. In such region, the less the difference in the resonant frequencies, the higher the resolution of detection the phase displacement. Thus, the accuracy of detecting the angular rate ω is higher, and the resolution in detecting the angular rate ω in a region of low values thereof is higher.

Modification of Third Embodiment

FIGS. 21 and 22 show one modification 10B of sensor element. FIG. 22 is a front view of the sensor element 10b as viewed in a direction toward the feedback electrodes 4b, and FIG. 21 is a cross section of the sensor element 10B as viewed in a direction indicated by the single dot phantom line arrow 21A shown in FIG. 22. The sensor element 10B includes a cylindrical piezoelectric body 2 which is formed in its top end around the periphery with four V-shaped notches at locations which are intersected by the extensions of the first diametrical direction D1 and the second diametrical direction D2 shown in FIG. 21. Notches Ra, Rb are disposed above an extension of the first diametrical direction D1 or above the exciting electrodes 5a, 5b while notches Rc, Rd are disposed above an extension of the second diametrical direction D2 or above the feedback electrodes 4a, 4b. Thus, the second oscillation, namely, an oscillation in direction D3 in which the first detection system exhibits a highest sensitivity of detection and in direction D4 in which the second detection system exhibits a highest sensitivity of detection, has a resonant frequency, which is substantially equal to the natural frequency of the cylindrical piezoelectric body 2 when the notches Ra, Rb, Rc and Rd are not provided, but the first oscillation or the principal oscillation (D2) and the subsidiary oscillation (D1) mentioned above has a resonant frequency which is higher than the natural frequency.

In the third embodiment and its modification mentioned above, weights Qa to Qd or notches Ra-Rd are provided at four locations which corresponds to the antinodes of oscillation of the vibrator system of the cylindrical piezoelectric body 2 in order to improve the accuracy of detection. However, the provision of either a weight or a notch at at least one location on the cylindrical piezoelectric body 2 may be sufficient to achieve the objective of producing a difference between the resonant frequencies of the vibrator system and the detection system. Alternatively, the weight or notch may be provided or formed at location corresponding to the node rather than at location corresponding to the antinode of oscillation of the vibrator system of the cylindrical piezoelectric body 2. In this instance, the resonant frequency of the vibrator system assumes the natural frequency of the cylindrical piezoelectric body 2, and the resonant frequency of the detection system in a direction (D3 or D4) in which the highest sensitivity of detection is achieved will be lower than the natural frequency (when weight is added) or higher than the natural frequency (when notch is formed).

While preferred embodiments of the invention have been shown and described above, a number of changes and modifications are possible therein. Accordingly, it is not intended that the invention be limited to the specific construction or arrangement disclosed herein, but that the right is reserved to all changes and modifications coming within the scope of invention defined by the appended claims.

What is claimed is:

1. An angular rate detector comprising an oscillator;

exciting means for exciting the oscillator for oscillation;

first and second oscillation detection means disposed at locations which are symmetrical with respect to the direction of a first oscillation of the oscillator which occurs in response to the excitation for detecting a second oscillation produced by Coriolis force which is produced in response to an angular rate applied to the oscillator;

and means for detecting a phase difference between the oscillations detected by the first and the second oscillation detecting means.

2. An angular rate detector according to claim 1 in which the first and the second oscillation detection means are disposed at locations which are offset from antinodes of the second oscillation by a given amount in a direction in which they are capable of also detecting the first oscillation.

3. An angular rate detector according to claim 2 in which the oscillator has a symmetrical configuration with respect to a center axis thereof and the first and the second oscillation detection means are disposed at locations which are offset from antinodes of the second oscillation by about 3° in tangential directions of rotations around the center axis toward nodes of the first oscillation.

4. An angular rate detector according to claim 1 in which the exciting means has an impedance, as viewed from the oscillator, which is different from an impedance of the first and the second oscillation detection means so that a resonant frequency of the exciting means and a resonant frequency of the oscillation detection means are different from each other by more than a given value.

5. An angular rate detector according to claim 4 in which the given value is equal to or above 10 Hz.

6. An angular rate detector according to claim 4 in which the first oscillation detection means includes a first electrode for detecting the second oscillation and a first amplifier connected to the first electrode, and the second oscillation detection means includes a second electrode for detecting the second oscillation and a second amplifier connected to the second electrode, the first and the second amplifier having a substantially equal termination resistance as viewed from the oscillator.

7. An angular rate detector according to claim 1 in which the oscillator has a resonant frequency in the direction of the first oscillation which is different from a resonant frequency in the direction of the second oscillation.

8. An angular rate detector according to claim 7 in which the resonant frequency of the oscillator is lower than the resonant frequency in the direction of the second oscillation by about 16 Hz.

9. An angular rate detector according to claim 7 in which the oscillator has a configuration which is symmetrical with respect to the center axis thereof, the exciting means including an exciting electrode, further comprising mass changing means disposed at a location where the oscillator intersects with a plane including the center of the exciting electrode and the center axis for determining a resonant frequency in the direction of the first oscillation.

10. An angular rate detector according to claim 9 in which the mass changing means comprises a weight added to the oscillator.

11. An angular rate detector according to claim 9 in which the mass changing means comprises a notch formed in the oscillator.

12. An angular rate detector according to claim 7 in which the oscillator has a configuration which is symmetrical with respect to a center axis thereof, further comprising mass changing means disposed at a location where the oscillator intersects with a plane containing the direction of the second oscillation and the center axis for determining a resonant frequency of the second oscillation.

13. An angular rate detector according to claim 12 in which the mass changing means comprises a weight added to the oscillator.

14. An angular rate detector according to claim 12 in which the mass changing means comprises a notch formed in the oscillator.

* * * * *